(12) United States Patent
Seiberle et al.

(10) Patent No.: US 6,649,230 B1
(45) Date of Patent: Nov. 18, 2003

(54) PHOTOACTIVE POLYMERS

(75) Inventors: Hubert Seiberle, Weil am Rhein (DE); Guy Marck, Schlierbach (FR); Olivier Muller, Lautenbach (FR)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/958,043

(22) PCT Filed: Mar. 27, 2000

(86) PCT No.: PCT/IB00/00349

§ 371 (c)(1),
(2), (4) Date: Oct. 3, 2001

(87) PCT Pub. No.: WO00/59966

PCT Pub. Date: Oct. 12, 2000

(30) Foreign Application Priority Data

Apr. 6, 1999 (GB) .............................................. 9907801

(51) Int. Cl.$^7$ ........................ C08F 246/00; C09K 19/38
(52) U.S. Cl. ...................... 428/1.2; 428/1.23; 428/1.25; 428/1.26; 428/1.27; 430/20; 522/148; 522/150; 522/153; 522/162; 522/164; 526/242; 526/279; 526/328; 528/25; 528/26; 528/65; 528/306; 528/322; 349/127
(58) Field of Search ............................ 430/20; 428/1.2, 428/1.23, 1.26, 1.27, 1.25; 522/129, 143, 148, 149, 150–161, 162–166; 528/25, 26, 65, 59, 322, 306; 526/242, 299, 328; 349/127

(56) References Cited

U.S. PATENT DOCUMENTS

| | | |
|---|---|---|
| 5,539,074 A | 7/1996 | Herr et al. |
| 5,602,661 A | 2/1997 | Schadt et al. |
| 5,965,761 A * | 10/1999 | Buchecker et al. ......... 556/440 |
| 6,084,057 A * | 7/2000 | Gibbons et al. ............ 528/353 |
| 6,103,322 A * | 8/2000 | Gibbons et al. ........... 428/1.25 |
| 6,107,427 A | 8/2000 | Herr et al. |
| 6,201,087 B1 | 3/2001 | Herr et al. |
| 6,340,506 B1 * | 1/2002 | Buchecker et al. ........ 428/1.26 |
| 2002/0061996 A1 * | 5/2002 | Buchecker et al. ...... 526/307.1 |

FOREIGN PATENT DOCUMENTS

| | | |
|---|---|---|
| EP | 0 611 786 | 8/1994 |
| EP | 0 763 552 | 3/1997 |
| EP | 0 860 455 | 8/1998 |
| WO | WO 96/10049 | 4/1996 |

OTHER PUBLICATIONS

Derwent Abstract of EP 0 611 786.
Derwent Abstract of EP 0 763 552.
Derwent Abstract of EP 0 860 455.
Derwent Abstract of WO 96/10049.

* cited by examiner

Primary Examiner—Susan W. Berman
(74) Attorney, Agent, or Firm—Finnegan, Henderson, Farabow, Garrett & Dunner, L.L.P.

(57) ABSTRACT

A photoactive polymer of the general formula I:

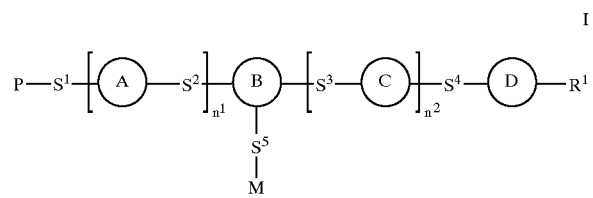

in which:
P is a photoactive group which can photoisomerise and/or photodimerise;
B represents an aromatic or alicyclic group, or B further represents a nitrogen atom or —$CR^2$—;
A, C, D each independently of the other represents an aromatic or alicyclic group;
M represents a repeating monomer unit in a homo- or copolymer;
$S^1, S^2, S^3, S^4, S^5$ represent a single covalent bond or a spacer unit;
$n^1, n^2$ are each independently a positive integer up to 2 with the proviso that $n^1 + n^2 \leq 2$;
$R^1$ is a hydrogen atom, or a straight-chain or branched alkyl residue wherein $R^2$ represents a hydrogen atom or lower alkyl.

The photoactive polymers may be used as orientation layers for liquid crystals and in the construction of unstructured and structured optical elements and multi-layer systems.

36 Claims, No Drawings

PHOTOACTIVE POLYMERS

This application is a national stage filing under 35 U.S.C. §371 of international application no. PCT/IB00/00349, filed on Mar. 27, 2000, which published in the English language.

The present invention relates to new photoactive polymers, and their use as orientation layers for liquid crystals and in the construction of unstructured and structured optical elements and multi-layer systems.

Different electro-optical effects used for liquid crystal displays (LCD) require alignment layers with very high pretilt angles. Vertically aligned nematic (VAN). LCDs for instance require pretilt angles between 85° and 90°, measured from the surface plane. In the case of hybrid aligned nematic (HAN)-LCDs, the pretilt angle at one of the substrates has to be in the above range, whereas the tilt angle at the other substrate is low (typically 0–10°). Brushed polyimides which are capable of inducing high pretilt angles suffer from the known drawbacks of the brushing technique. In the case of VAN-LCDs especially scratches caused by brushing and insufficient pretilt angle uniformity are well known problems of the brushing technique. On the other hand, stable photoalignable materials for high pretilt angles, which would solve the above problems, are not known so far.

Most of the known electro-optic LCD-modes suffer from residual birefringence of the liquid crystal layer which results in reduced contrast, intrinsic colours and/or restricted viewing angles. Optical retarders are applied to the LCD to compensate for the residual birefringence. Tilted LC-configurations which are formed upon applying a voltage to the LCD are used in most of the commercialised LCDs to adjust grey scale. The very asymmetric viewing angle dependence of such tilted LC-configurations is optimally compensated if the optical axis of the compensating retarder is tilted as well. Liquid crystal polymers (LCP) which were photoaligned by LPP-materials prior to polymerisation are ideally suited to such an application, as the tilt of the optical axis can principally be adjusted to any value between 0° and 90° by the adjacent alignment layer. A drawback of known alignment materials inducing very high pretilt angles is their high surface tension which causes wetting problems. Consequently, it is not possible to coat a uniform layer of LCP-prepolymers on top of such alignment layers.

EP-A-0 611 786 (F. Hoffmann-La Roche AG) discloses polymers having isomerisation/dimerisation units of the general formula:

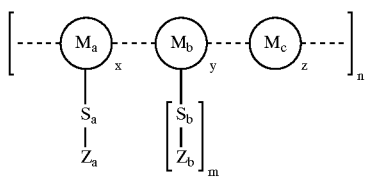

wherein:
$M_a$, $M_b$, $M_c$ signify monomer units for homo- or copolymers;
x, y, z indicate mole fractions of the copolymers, whereby in each case $0<x\leq1$; $0\leq y\leq1$ and $0\leq z\leq1$;
Sa, Sb represent spacer units;
Za, Zb represent molecule units which can undergo photochemical isomerisation/dimerisation;
n is from 4–100 000; and
m is 0 or 1.

These linear and cyclic polymers or oligomers have a photoreactive ethene group for use as orientating layers for liquid crystals.

WO-A-96/10049 (F. Hoffmann-La Roche AG) discloses polymers of the general formula:

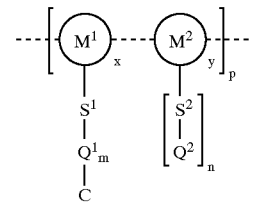

wherein:
$M^1$ and $M^2$ signify monomer units for homo- or copolymers; x and y indicate mole fractions of the comonomers, with in each case $0<x\leq1$ and $0\leq y<1$ and $x+y=1$;
p signifies 4 to 30 000;
$S^1$ and $S^2$ signify spacer units;
$Q^1$ signifies a structural unit of the formula:

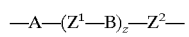           IIa;

$Q^2$ signifies a structural unit of the formula:

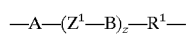           IIb;

A and B each independently signify pyridine-2,5-diyl, pyrimidine-2,5-diyl, 1,4-cyclohexylene, 1,3-dioxane-2,5-diyl or optionally substituted 1,4-phenylene;
$Z^1$ and $Z^2$ each independently signify a single covalent bond, —CH₂—CH₂—, —CH₂O—, —OCH₂—, —CONR—, —RNCO—, —COO— or —OOC—;
R signifies hydrogen or lower alkyl;
$R^1$ signifies hydrogen, optionally substituted alkyl or alkoxy with in each case 1 to 12 carbon atoms, cyano, nitro or halogen;
z signifies 0 or 1;
C signifies a photochemically dimerisable coumarin or quinolinone derivative; and
m and n each independently signify 0 or 1.

These linear and cyclic polymers or oligomers of coumarin and quinolinone derivatives have a photoreactive ethene group and may be used as orienting layers for liquid crystals.

EP-A-0 763 552 (Rolic AG) discloses polymer compositions in which repeating units of general formula I are present:

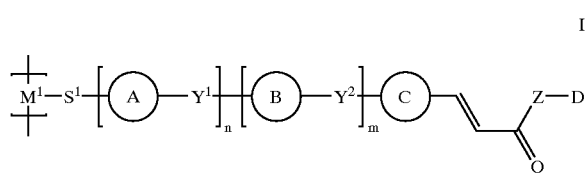

wherein
$M^1$ signifies a repeating monomer unit from the group; acrylate, methacrylate, 2-chloroacrylate, 2-phenylacrylate; optionally N-lower alkyl substituted acrylamide, methacrylamide, 2-chloroacrylamide and 2-phenylacrylamide; vinyl ether, vinyl ester, styrene derivative, siloxane;

$S^1$ signifies spacer units such as, for example, a single covalent bond, a straight-chain or branched alkylene grouping represented hereinafter by —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—, which is optionally mono- or multiply-substituted with fluorine, chlorine or cyano and in which r and s are each a whole number of 1 to 20, with the proviso that r+s≦20, and $R^2$ and $R^3$ each independently signify hydrogen or lower alkyl;

ring A signifies phenylene which is unsubstituted or optionally substituted with fluorine, chlorine, cyano, alkyl or alkoxy, pyridine-2,5-diyl, pyrimidine-2,5-diyl, 1,3-dioxane-2,5-diyl, cyclohexane-1,4-diyl, piperidine-1,4-diyl, piperazine-1,4-diyl;

ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene, 1,3-dioxane-2,5-diyl, cyclohexane-1,4-diyl;

$Y^1$, $Y^2$ each independently signify a single covalent bond, —$(CH_2)_t$—, —O—, —CO—, —CO—O—, —O—OC—, —$NR^4$—, —CO—$NR^4$—, —$R^4N$—CO—, —$(CH_2)_u$—O—, —O—$(CB_2)_u$—, —$(CH_2)_u$—$NR^4$— or —$NR^4$—$(CH_2)_u$—, in which $R^4$ signifies hydrogen or lower alkyl;

t signifies a whole number of 1 to 4;

u signifies a whole number of 1 to 3;

m, n each independently signify 0 or 1;

ring C signifies phenylene which is unsubstituted or optionally substituted with fluorine, chlorine, cyano, alkyl or alkoxy, or pyrimidine-2,5-diyl, pyridine-2,5-diyl, 2,5-thiophenylene, 2,5-furanylene, 1,4- or 2,6-naphthylene;

Z signifies —O— or —$NR^5$—, in which $R^5$ signifies hydrogen or lower alkyl, or a second group of formula D, in which D signifies a straight-chain or branched alkylene group with 1 to 20 carbon atoms which is optionally substituted with fluorine or chlorine, a cycloalkyl residue with 3 to 8 ring atoms which is optionally substituted with fluorine, chlorine alkyl or alkoxy.

These cross-linkable, photoactive polymer materials with 3-arylacrylic acid esters and amides may be used as orienting layers for liquid crystals and for the production of non-structured and structured optical elements and multi-layer systems.

EP-A-0860455 (Rolic AG) discloses polymers of the general formula I:

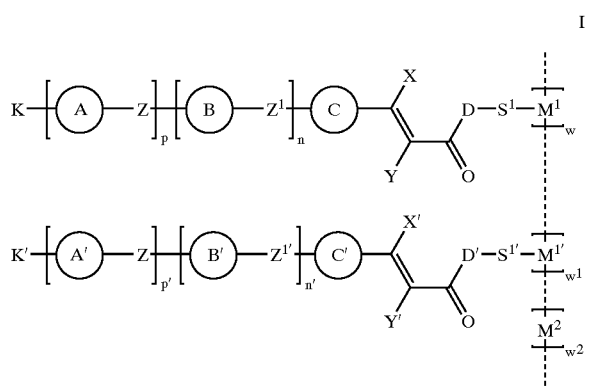

wherein:

$M^1$, $M^{1'}$ denote a recurring monomer unit form the group: acrylate, methacrylate, 2-chloroacrylate, 2-phenylacrylate; optionally by lower alkyl N-substituted acrylamide, methacrylamide, 2-chloroacrylamide and 2-phenylacrylamide; vinyl ethers, vinyl esters, styrene derivatives, siloxanes;

$M^2$ denotes a recurring monomer unit from the group: acrylate, methacrylate, 2-chloroacrylate, 2-phenylacrylate, optionally by lower alkyl N-substituted acrylamide, methacrylamide, 2-chloroacrylamide and 2-phenylacrylamide; vinyl ether, vinyl ester; straight-chain or branched alkyl esters of acrylic or methacrylic acid, allyl esters of acrylic or methacrylic acid, alkyl vinyl ethers or ester, phenoxyalkyl acrylates or phenoxyalkyl methacrylates or hydroxyalkyl acrylates or hydroxyalkyl methacrylates, phenylalkyl acrylates or phenylalkyl methacrylates, in which the alkyl groups have 1 to 20, preferably 5 to 20, but in particular 5 to 18 carbon atoms; acrylonitrile, methacrylonitrile, styrene, 4-methylstyrene or siloxanes;

w, $w^1$, $w^2$ are molar fractions of the comonomers with $0<w\leq1.0\leq w^1<1$ and $0\leq w^2\leq 0.5$;

$S^1$, $S^{1'}$, independently of one another a spacer unit, such as an optionally monosubstituted or polysubstituted by fluorine, chlorine or cyano straight-chain or branched alkylene group —$(CH_2)_r$—, or a chain of formula —$(CH_2)_r$—L—$(CH_2)_s$—, in which L denotes a single bond or a linkng functional group such as —O—, —COO—, —OOC—, —NR—, —$NR^1$—CO—, —CO—$NR^1$—, —$NR^1$—COO—, —OCO—$NR^1$—, —$NR^1$—CO—$NR^1$—, —CH═CH—, —C≡C—; in which $R^1$ denotes hydrogen or lower alkyl and r and s each represent an integer from 1 to 20, with the proviso that r+s≦24;

D, D' independently of one another —O— or $NR^2$— in which $R^2$ denotes hydrogen or lower alkyl;

X, X', Y, Y' independently of one another denote hydrogen, fluorine, chlorine, cyano, alkyl with 1 to 12 carbon atoms which is optionally substituted with fluorine and in which optionally one $CH_2$ group or a plurality of non-neighbouring $CH_2$ groups may be replaced by O, —COO—, —OOC—, and/or —CH═CH—;

A, A' independently of one another denote phenylene, pyridine-2,5-diyl, pyrimidine-2,5-diyl, 1,3-dioxane-2,5-diyl, cyclohexane-1,4-diyl, piperidine-1,4-diyl, piperazine-1,4-diyl which is unsubstituted or optionally substituted with fluorine, chlorine, cyano, alkyl, alkoxy or fluoroalkoxy;

B, B' independently of one another denote phenylene, pyridine-2,5-diyl, pyrimidine-2,5-diyl, 1,4- or 2,6-naphthylene, 1,3-dioxane-2,5-diyl, cyclohexane-1,4-diyl which is unsubstituted or optionally substituted with fluorine, chlorine, cyano, alkyl, alkoxy or fluoroalkoxy;

C, C' independently of one another denote phenylene, or pyrimidine-2,5-diyl, pyridine-2,5-diyl, 2,5-thiophenylene, 2,5-furanylene, 1,4- or 2,6-naphthylene which is unsubstituted or optionally substituted with fluorine, chlorine, cyano, alkyl, alkoxy or fluoroalkoxy;

K, K' independently of one another denote hydrogen, fluorine, chlorine, cyano, nitro or a straight-chain or branched alkyl-, alkoxy-alkyl-COO—, alkyl-CO—NR$^3$ or alkyl-OCO-group with 1 to 20 carbon atoms optionally substituted with fluorine, chlorine, cyano or nitro in which optionally a $CH_2$ group or a plurality of non-neighbouring $CH_2$ groups may be replaced by —O—, —CH=CH— or —C≡C— and in which R$^3$ hydrogen or lower alkyl;

with the proviso that at least one of the rings A, B, C and/or at least one of the rings A', B', C' represents a phenylene group, which is substituted with at least one alkoxy group or fluoroalkoxy group, in which, if K denotes alkoxy or fluoroalkoxy, at least one of the rings A, B, C and/or at least one of the rings A', B', C' represents a phenylene group, which is substituted with at least one further alkoxy group or fluoroalkoxy group;

Z, Z', Z', Z$^{1'}$ independently of one another denote a single covalent bond, —(CH$_2$)$_t$—, —O—, —CO—, —CO—O—, —O—OC—, —NR$^4$—, —CO—NR$^4$—, —R$^4$N—CO—, —(CH$_2$)$_u$—O—, —O—(CH$_2$)$_u$—, —(CH$_2$)$_u$—NR$^4$— or —NR$^4$—(CH$_2$)$_u$—;

in which R$^4$ denotes hydrogen or lower alkyl, t denotes an integer from 1 to 4;

u denotes an integer from 1 to 3; and p, p', n, n' independently of one another denotes 0 or 1.

These crosslinkable photoactive polymers may be used as orientation layers for liquid crystals and for the production of unstructured or structured optical elements and mulitilayer systems.

The present invention provides optically active or inactive photoactive polymers of the general formula I:

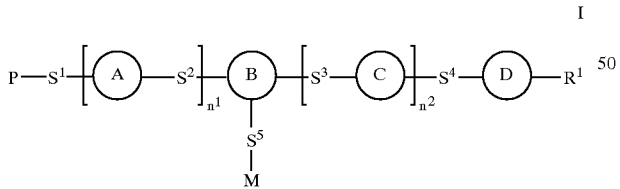

I in which:

P is a photoactive group which can photoisomerise and/or photodimerise;

B represents an aromatic or alicyclic group which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, —Si(CH$_3$)$_2$—O—Si(CH$_3$)$_2$—, NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—O—, with the proviso that oxygen atoms are not directly attached to each other, and wherein R$^2$ represents a hydrogen atom or lower alkyl, or B further represents a nitrogen atom or —CR$^2$—;

A, C, D each independently of the other represents an aromatic or alicyclic group which is unsubstituted or substituted by fluorine, chlorine, cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, —Si(CH$_3$)$_2$—O—Si(CH$_3$)$_2$—, —NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—O—, with the proviso that oxygen atoms are not directly attached to each other, and wherein R$^2$ represents a hydrogen atom or lower alkyl;

M represents a repeating monomer unit in a homo- or copolymer;

S$^1$, S$^2$, S$^3$, S$^4$, S$^5$ represent a single covalent bond or a spacer unit, such as a straight-chain or branched alkylene residue which is unsubstituted, mono-substituted by cyano or halogeno, or poly-substituted by halogeno, having 1 to 24 carbon atoms, wherein one or more $CH_2$ groups may independently be replaced by —O—, —CO—, —CO—O—, —O—CO—, —Si(CH$_3$)$_2$—O—Si(CH$_3$)$_2$—, —NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—O—, with the proviso that oxygen atoms are not directly attached to each other, and wherein R$^2$ represents a hydrogen atom or lower alkyl;

n$^1$, n$^2$ are each independently 0, 1 or 2 with the proviso that n$^1$+n$^2 \leq 2$ R$^1$ is a hydrogen atom, or a straight-chain or branched alkyl residue which is unsubstituted, mono-substituted by cyano or halogeno, or poly-substituted by halogeno, having 1 to 18 carbon atoms, wherein one or more $CH_2$ groups may independently be replaced by —O—, —CO—, —CO—CO, —O—CO—, —Si(CH$_3$)$_2$—O—Si(CH$_3$)$_2$—, —NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—C), with the proviso that oxygen atoms are not directly attached to each other, and wherein R$^2$ represents a hydrogen atom or lower alkyl.

The invention also provides the use of the polymers of the general formula I as orientation layers for liquid crystals and in the construction of unstructured and structured optical elements and multi-layer systems.

The new photoreactive materials show excellent alignment and induce very high pretilt angles in the liquid crystal layer in LCDs.

Surprisingly these materials can easily be coated with LCP-prepolymers without wetting problems. For example, in a liquid crystal cell the pretilt angle of the optical axis in an LCP-layer is very high. Tilt domains which are sometimes observed in tilted LCP-layers do not show up.

Preferred photoactive groups P are groups which undergo a photocyclisation and have the general formula II and III:

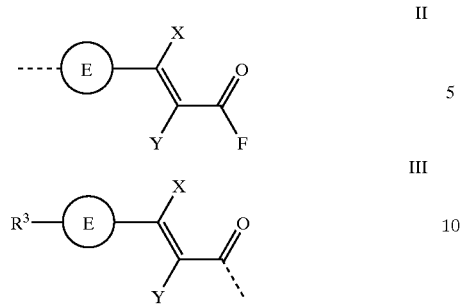

wherein the broken line indicates the point of linkage to $S^1$ and wherein:

- E represents phenylene which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, —Si(CH$_3$)$_2$—O—Si(CH$_3$)$_2$—, —NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—O—, with the proviso that oxygen atoms are not directly attached to each other, and wherein $R^2$ represents a hydrogen atom or lower alkyl, or E further represents pyrimidine-2,5-diyl, pyridine-2,5-diyl, 2,5-thiophenylene, 2,5-furanylene, or 1,4- or 2,6-naphthylene;

- F represents —OR$^4$, —NR$^5$R$^6$, or an oxygen atom linked to ring E in the ortho position to form a coumarin unit wherein $R^4$, $R^5$ and $R^6$ are a hydrogen atom or a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O—, —CO—, —CO—O—, —O—CO—, —CH=CH—, with the proviso that oxygen atoms are not directly attached to each other, or $R^5$ and $R^6$ are linked together to form an alicyclic ring with 5 to 8 atoms;

- X, Y each independently of the other represents hydrogen, fluorine, chlorine, cyano, alkyl optionally substituted by fluorine having from 1 to 12 carbon atoms in which optionally one or more non-adjacent $CH_2$ groups are replaced by —O—, —CO—O—, —O—CO— and/or —CH=CH—;

- $R^3$ is a hydrogen atom, or a straight-chain or branched alkyl residue which is unsubstituted, mono-substituted by cyano or halogeno, or poly-substituted by halogeno, having 1 to 18 carbon atoms, wherein one or more $CH_2$ groups may independently be replaced by —O—, —CO—, —CO—O—, —O—CO—, —Si(CH$_3$)$_2$—O—Si(CH$_3$)$_2$—, —NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—O—, with the proviso that oxygen atoms are not directly attached to each other, and wherein $R^2$ represents a hydrogen atom or lower alkyl.

Special preferred photoactive groups P have the general formula IV and V:

wherein the broken line indicates the point of linkage to $S^1$ and wherein $R^3$ has the meaning given under formula II and III;

- F represents —OR$^4$ or —NR$^5$R$^6$, wherein $R^4$ and $R^5$ are a cyclic, straight-chain or branched alkyl residue which unsubstituted, mono-substituted by halogeno, or poly-substituted by halogeno, having 1 to 18 carbon atoms and wherein one or more $CH_2$ groups may independently be replaced by —O— or —CH=CH—, with the proviso that oxygen atoms are not directly attached to each other, and wherein $R^6$ is a hydrogen atom or a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O— or —CH=CH—, with the proviso that oxygen atoms are not directly attached to each other, or $R^5$ and $R^6$ link together to form an alicyclic zing with 5 to 8 atoms; and

- E represents phenylene which is unsubstituted or substituted by a cyclic, straight-chain or branched alkyl residue which is unsubstituted, mono-substituted by halogeno, or poly-substituted by halogeno, having 1 to 12 carbon atoms and wherein one or more $CH_2$ groups may independently be replaced by —O—, —CO—, —CO—O—, —O—CO, —CH=CH—, —C≡C—, with the proviso that oxygen atoms are not directly attached to each other, or E further represents pyrimidine-2,5-diyl, pyridine-2,5-diyl, 2,5-thiophenylene, 2,5-furanylene, 1,4- or 2,6-naphthylene.

Especially preferred photoactive P groups have the general formula IV wherein:

- E represents phenylene which is unsubstituted or substituted by a straight-chain or branched alkyl residue which is unsubstituted or mono- or polysubstituted by fluorine, having 1 to 6 carbon atoms and wherein one or more $CH_2$ groups may independently be replaced by —O—, —CO—, —CO—O—, —O—CO, —CH=CH—, with the proviso that oxygen atoms are not directly attached to each other, or E further represents pyrimidine-2,5-diyl, pyridine-2,5-diyl, 2,5-furanylene, 1,4- or 2,6-naphthylene;

- F represents —OR$^4$ or —NHR$^5$, wherein $R^4$ and $R^5$ are a cyclic, straight-chain or branched alkyl residue which is unsubstituted or mono- or polysubstituted by fluorine, having 1 to 18 carbon atoms and wherein one or more $CH_2$ groups may independently be replaced by —O—, with the proviso that oxygen atoms are not directly attached to each other.

The preferred polymers of formula I can be further divided into:

a) polymers of formula I in which B represents a aromatic or alicyclic group and where $n^1+n^2=1$;

b) polymers of formula I in which B represents a aromatic or alicyclic group and where $n^1+n^2=0$;

c) polymers of formula I in which B represents a group —CR²— and where 0<n¹+n²≦2; and d) optically inactive polymers of formula I.

Preferred groups B are aromatic which are unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, —CH═CH—, with the proviso that oxygen atoms are not directly attached to each other, or B further represents —CR²—, wherein $R^2$ represents hydrogen atom or lower alkyl.

Especially preferred groups B are 1,2,5-benzenetriyl and 1,3,5-benzenetriyl groups which are unsubstituted or substituted by fluorine and where the spacer group $S^5$ is in position 1.

Preferred groups A, C and D are phenylene which is unsubstituted or substituted by fluorine, chlorine, cyano, or by a cyclic, straight-chain or branched alkyl residue which is unsubstituted, mono-substituted by cyano or halogeno, or poly-substituted by halogeno, having 1 to 12 carbon atoms, wherein one or more $CH_2$ groups may independently be replaced by —O—, —CO—, —CO—O—, —O—CO—, —CH═CH—, —C≡C— or —O—CO—O— with the proviso that oxygen atoms are not directly attached to each other, or A, C and D further represents cyclohexane-1,4-diyl, pyrimidine-2,5-diyl, pyridine-2,5-diyl, 1,4- or 2,6-naphthylene.

Especially preferred groups A, C and D are phenylene, which is unsubstituted or substituted by fluorine, straight-chain or branched alkyl residue which is unsubstituted or mono- or polysubstituted by fluorine, having 1 to 8 carbon atoms, wherein one or more $CH_2$ groups may independently be replaced by —O—, —CO—, —CO—O—, —O—CO— or —CH═CH— with the proviso that oxygen atoms are not directly attached to each other, or A, C and D further represents cyclohexane-1,4-diyl, pyrimidine-2,5-diyl, pyridine-2,5-diyl or 2,6-naphthylene.

Preferred "spacer units" $S^1$, $S^2$, $S^3$, $S^4$ and $S^5$ in the context of the present invention represent a single covalent bond or a spacer unit, such as a straight-chain or branched alkylene grouping represented by $(CH_2)_r$—, optionally mono- or poly-substituted by fluorine, chlorine or cyano, or a chain of the formula —$L^1$—$(CH_2)_r$—$L^2$— or —$L^1$—$(CH_2)_r$—$L^2$—$(CH_2)_s$—$L^3$—, wherein $L^1$, $L^2$ and $L^3$ each independently of the others represent a single bond or linking functional groups such as —O—, —CO—O—, —O—CO—, —NR²—, —NR²—CO—, —CO—NR²—, —NR²—CO—O—, —O—CO—NR²—, —NR²—CO—NR²—, —CH═CH—, —C≡C—, —O—CO—O—, —Si(CH₃)₂—O—Si(CH₃)₂—, wherein $R^2$ represents hydrogen atom or lower alkyl and r and s are each an integer from 1 to 20, with the proviso that r+s≦24 and with the proviso that in the case where the repeating monomer unit M is linked to $S^5$ via a nitrogen atom or a oxygen atom which is by definition part of M, as for example in acrylate, methacrylate, 2-chloroacrylate, 2-phenylacrylate, optionally N-lower alkyl substituted acrylamide, methacrylamide, 2-chloroacrylamide, 2-phenylacrylamide; or a vinyl ether, vinyl ester, maleic acid derivative or fumaric acid derivative; $L^1$ signifies a single bond.

Especially preferred "spacer units" $S^1$, $S^2$, $S^3$, $S^4$ and $S^5$ in the context of the present invention are a straight-chain or branched alkylene grouping, represented by —$(CH_2)_r$—, and also —$(CH_2)_r$—O—, —$(CH_2)_r$—CO—, —$(CH_2)_r$—CO—O—, —$(CH_2)_r$—O—CO—, —$(CH_2)_r$—CO—NR²—, —$(CH_2)_r$—NR²—CO—, —$(CH_2)_r$—NR²—, —O—$(CH_2)_r$—, —CO—O—$(CH_2)_r$—, —O—CO—$(CH_2)_r$—, —NR²—CO—$(CH_2)_r$—, —CO—NR²—$(CH_2)_r$—, —NR²—$(CH_2)_r$—, —O—$(CH_2)_r$—O—CO—, —O—$(CH_2)_r$—CO—O—, —O—$(CH_2)_r$—CO—NR²—, —O—$(CH_2)_r$—NR²—, —O—$(CH_2)_r$—O—, —O—$(CH_2)_r$—NR²—CO—, —NR²—$(CH_2)_r$—CO—O—, —NR²—$(CH_2)_r$—O—, —NR²—$(CH_2)_r$—NR²—, —NR²—$(CH_2)_r$—O—CO—, —CO—NR²—$(CH_2)_r$—O—, —CO—NR²—$(CH_2)_r$—NR²—, —CO—NR²—$(CH_2)_r$—O—CO—, —O—CO—$(CH_2)_r$—CO—, —O—CO—$(CH_2)_r$—O—, —O—CO—$(CH_2)_r$—NR²—, —O—CO—$(CH_2)_r$—CO—O—, —O—CO—$(CH_2)_r$—CO—NR²—, —O—CO—$(CH_2)_r$—NR²—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—NR²—CO—$(CH_2)_s$—, —$(CH_2)_r$—NR²—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—NR²—CO—$(CH_2)_s$—O—, —$(CH_2)_r$—NR²—CO—O—$(CH_2)_s$—O—, —O—$(CH_2)_r$—O—$(CH_2)_s$—, —O—$(CH_2)_r$—CO—O—$(CH_2)_s$—, —O—$(CH_2)_r$—NR²—CO—O—$(CH_2)_s$—, —O—$(CH_2)_r$—CO—O—$(CH_2)_s$—O—, —O—$(CH_2)_r$—O—$(CH_2)_s$—O—, —O—$(CH_2)_r$—NR²—CO—$(CH_2)_s$—O—, —O—$(CH_2)_r$—NR²—CO—O—$(CH_2)_s$—O—, —CO—O—$(CH_2)_r$—O—$(CH_2)_s$—, —CO—O—$(CH_2)_r$—O—, —CO—O—$(CH_2)_r$—O—$(CH_2)_s$—O—, wherein r and s are each an integer from 1 to 20, but especially from 2 to 12, with the proviso that r+s≦21, especially ≦15, and wherein $R^2$ represents hydrogen or lower alkyl.

Most preferred "spacer units" $S^1$, $S^2$, $S^3$, $S^4$ and $S^5$ are a straight-chain alkylene grouping represented by —$(CH_2)_r$—, and also —$(CH_2)_r$—O—, —$(CH_2)_r$—CO—O—, —$(CH_2)_r$—O—CO—, —$(CH_2)_r$—CO—NH—, —$(CH_2)_r$—NH—CO—, —O—$(CH_2)_r$—, —CO—O—$(CH_2)_r$—, —CO—NH—$(CH_2)_r$—, —O—CO—$(CH_2)_r$—, —O—CO—$(CH_2)_r$—CO—O—, —O—$(CH_2)_r$—O—CO—, —O—$(CH_2)_r$—CO—NH—, —O—$(CH_2)_r$—NH—CO—, —CO—O—$(CH_2)_r$—O—, —CO—NH—$(CH_2)_r$—O—, —O—$(CH_2)_r$—O—, —$(CH_2)_r$—NH—CO—$(CH_2)_s$—, —$(CH_2)_r$—NH—CO—O—$(CH_2)_s$—, —$(CH_2)_r$—O—$(CH_2)_s$—O—, —$(CH_2)_r$—NH—CO—$(CH_2)_s$—O—, —$(CH_2)_r$—NH—CO—O—$(CH_2)_s$—O—, —O—$(CH_2)_r$—NH—CO—$(CH_2)_s$—, —O—$(CH_2)_r$—O—$(CH_2)_s$—O—, —O—CO—$(CH_2)_r$—O—$(CH_2)_s$—O—, —CO—O—$(CH_2)_r$—O—$(CH_2)_s$—O—, —O—$(CH_2)_r$—NH—CO—$(CH_2)_s$—O—, —O—CO—$(CH_2)_r$—NH—CO—$(CH_2)_s$—O—, wherein r and s are each an integer from 2 to 12 and the sum of r+s≦15.

Examples of preferred "spacer units" $S^1$, $S^2$, $S^3$, $S^4$ and $S^5$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

Preferred groups $R^1$ are a hydrogen atom, or a straight-chain or branched alkyl residue which is unsubstituted or halogeno or polyhalogeno-substituted, having 1 to 12 carbon atoms, wherein one or more $CH_2$ groups may independently be replaced by —O—, —CO—, —CO—O—, —O—CO—, —CH=CH— or —C≡C—, with the proviso that oxygen atoms are not directly attached to each other.

Especially preferred groups $R^1$ are straight-chain or branched alkyl residue, having 1 to 8 carbon atoms, wherein one or more $CH_2$ groups are each independently replaced by —O—, —CO—, —CO—O— or —O—CO— or —CH=CH—, with the proviso that oxygen atoms are not directly attached to each other. For example, methyl, ethyl, propyl, butyl, isobutyl, pentyl, hexyl, octyl, allyl, but-3-en-1-yl, pent-4-en-1-yl, hex-5-en-1-yl, methoxy, ethoxy, propoxy, butoxy, pentyloxy, hexyloxy, heptyloxy, octyloxy, 3-methylpentyloxy, but-3-enyloxy, pent-4-enyloxy and the like.

Preferred repeating monomer units M are acrylate, methacrylate, 2-chloroacrylate, 2-phenylacrylate, optionally N-lower alkyl substituted acrylamide, methacrylamide, 2-chloroacrylamide, 2-phenylacrylamide, vinyl ether, vinyl ester, styrene derivatives, siloxanes, imides, amic acids and their esters, amidimides, maleic acid derivatives, fumaric acid derivatives.

Especially preferred repeating monomer unit M are acrylate, methacrylate, optionally N-lower-alkyl-substituted acrylamide, methacrylamide, vinyl ether, vinyl ester, styrene derivatives, imides, amic acids and there esters, amidimides.

Most preferred repeating monomer units M are acrylate, methacrylate, styrene derivatives, imides, amic acids and their esters, and amidimides.

Preferred imide units M from which the main chains of the side-chain polymers according to the invention are generally synthesised are groups of the general formulae III, V and VII and/or the analogous amic acid groups and amic acid ester groups of the general formulae IV, VI and VIII:

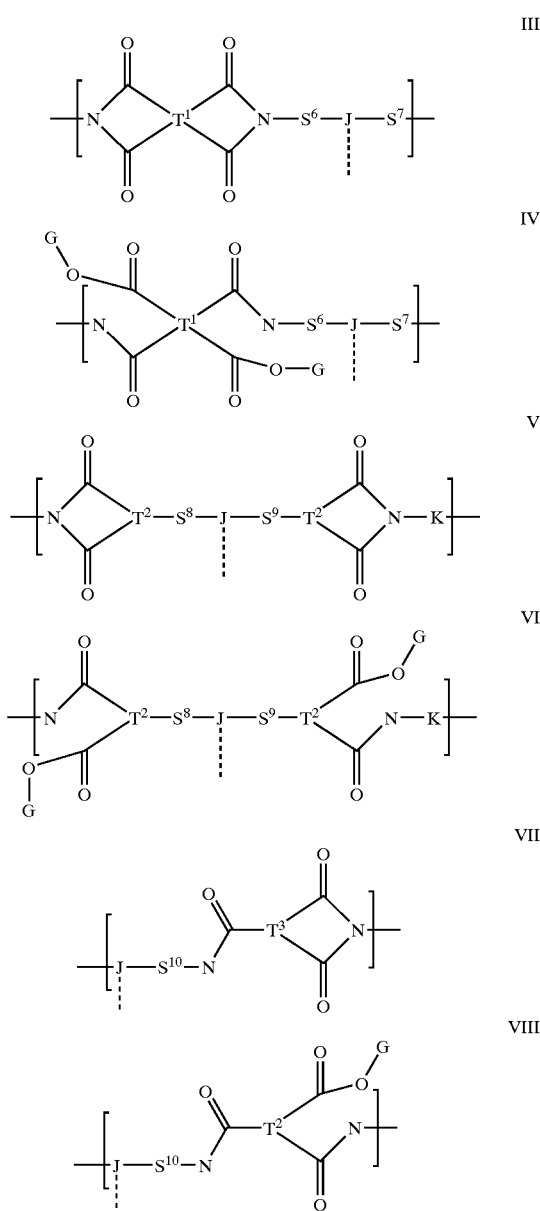

in which the broken line symbolises the linkage to $S^5$ and wherein:
  $T^1$ represents the tetravalent organic radical of a tetracarboxylic acid dianhydride after formal removal of the two —CO—O—CO— groups, the four valencies of which are distributed between four different carbon atoms of the radical;
  $T^2$, $T^3$ each independently of the other represents an aromatic or alicyclic trivalent group, the three valencies of which are distributed between three different carbon atoms of the group, the group being unsubstituted or substituted by fluorine, chlorine, cyano, by a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O—, —CO—, —CO—O—, —O—CO—, —CH=CH—, —C≡C—, with the proviso that oxygen atoms are not directly attached to each other;

$S^6$, $S^7$, $S^8$, $S^9$, $S^{10}$ represent a single covalent bond or a spacer unit, such a straight-chain or branched alkylene residue which is unsubstituted, mono-substituted by cyano or halogeno, or poly-substituted by halogeno, having 1 to 24 carbon atoms, wherein one or more $CH_2$ groups may independently be replaced by —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, with the proviso that oxygen atoms are not directly attached to each other, and wherein $R^2$ represents hydrogen atom or lower alkyl;

J represents an aromatic or alicyclic divalent, trivalent or tetravalent group, the valencies of which are distributed between different atoms of the group, which is unsubstituted or substituted by fluorine, chlorine, cyano, by a cyclic, straight-chain or branched alkyl residue which is unsubstituted or mono cyano, or halogeno or polyhalogeno-substituted, having 1 to 18 carbon atoms and wherein one or more $CH_2$ groups may independently be replaced by —O—, —CO—, —CO—O—, —O—CO—, —CH=CH—, —C≡C—, with the proviso that oxygen atoms are not directly attached to each other, or J further represents a nitrogen atom or —$CR^2$— and wherein $R^2$ represents a hydrogen atom or lower alkyl;

K represents the radical of an aliphatic, alicyclic or aromatic diamine after formal removal of the two amino groups; and G represents hydrogen atom or a monovalent organic group, derived from an alcohol after formal removal of the hydroxy group.

The tetracarboxylic acid dianhydride on which the tetravalent organic radical $T^1$ is based may be aliphatic, alicyclic or aromatic.

Preferred examples of aliphatic or alicyclic tetracarboxylic acid anhydrides are:

butanetetracarboxylic acid dianhydride;
ethylenemaleic acid dianhydride;
1,2,3,4-cyclobutanetetracarboxylic acid dianhydride;
1,2,3,4-cyclopentanetetracarboxylic acid dianhydride;
2,3,5-tricarboxycyclopentylacetic acid dianhydride;
3,5,6-tricarboxynorbornylacetic acid dianhydride;
2,3,4,5-tetrahydrofurantetracarboxylic acid dianhydride;
4-(2,5-dioxotetrahydrofuran-3-yl)tetrahydronaphthalene-1,2-dicarboxylic acid dianhydride;
5-(2,5-dioxotetrahydrofuran-3-yl)-3-methyl-3-cyclohexene-1,2-dicarboxylic acid dianhydride;
bicyclo[2.2.2]oct-7-ene-2,3,5,6-tetracarboxylic acid dianhydride;
bicyclo[2.2.2]octane-2,3,5,6-tetracarboxylic acid dianhydride; and
1,8-dimethylbicyclo[2.2.2]oct-7-ene-2,3,5,6-tetracarboxylic acid dianhydride.

Examples of preferred aromatic tetracarboxylic acid dianhydrides are:

pyromellitic acid dianhydride;
3,3',4,4'-benzophenonetetracarboxylic acid dianhydride;
4,4'-oxydiphthalic acid dianhydride;
3,3',4,4'-diphenylsulfonetetracarboxylic acid dianhydride;
1,4,5,8-naphthalenetetracarboxylic acid dianhydride;
2,3,6,7-naphthalenetetracarboxylic acid dianhydride;
3,3',4,4'-dimethyldiphenylsilanetetracarboxylic acid dianhydride;
3,3',4,4'-tetraphenylsilanetetracarboxylic acid dianhydride;
1,2,3,4-furantetracarboxylic acid dianhydride;
4,4'-bis(3,4-dicarboxyphenoxy)diphenyl sulfide dianhydride;
4,4'-bis(3,4-dicarboxyphenoxy)diphenyl sulfone dianhydride;
4,4'-bis(3,4-dicarboxyphenoxy)diphenylpropane dianhydride;
3,3',4,4'-biphenyltetracarboxylic acid dianhydride;
ethylene glycol bis(trimellitic acid)dianhydride;
4,4'-(1,4-phenylene)bis(phthalic acid)dianhydride;
4,4'-(1,3-phenylene)bis(phthalic acid)dianhydride;
4,4'-(hexafluoroisopropylidene)diphthalic acid dianhydride;
4,4'-oxydi(1,4-phenylene)bis(phthalic acid)dianhydride; and
4,4'-methylenedi(1,4-phenylene)bis(phthalic acid) dianhydride.

Especially preferred are:

1,2,3,4-cyclobutanetetracarboxylic acid dianhydride;
1,2,3,4-cyclopentanetetracarboxylic acid dianhydride;
2,3,5-tricarboxycyclopentylacetic acid dianhydride;
5-(2,5-dioxotetrahydrofuran-3-yl)-3-methyl-3-cyclohexene-1,2-dicarboxylic acid dianhydride;
4-(2,5-dioxotetrahydrofuran-3-yl)tetrahydronaphthalene-1,2-dicarboxylic acid dianhydride;
4,4'-(hexafluoroisopropylidene)diphthalic acid dianhydride; and
bicyclo[2.2.2]oct-7-ene-2,3,5,6-tetracarboxylic acid dianhydride.

The groups $T^2$ and $T^3$ can be derived from aliphatic, alicyclic or aromatic dicarboxylic acid anhydrides.

Preferred groups $T^2$ and $T^3$ are trivalent aromatic or carbocyclic groups, the three valencies of which are so distributed between three different carbon atoms that two of those valencies are located at adjacent carbon atoms.

Especially preferred groups $T^2$ and $T^3$ are trivalent benzene derivatives, the three valencies of which are so distributed between three different carbon atoms that two of those valencies are in the ortho position relative to one another.

Preferred "spacer units" $S^6$ in the context of the present invention are a straight-chain or branched alkylene grouping, represented by —($CH_2$)$_r$—, and also —($CH_2$)$_r$—O—, —($CH_2$)$_r$—CO—, —($CH_2$)$_r$—CO—O—, —($CH_2$)$_r$—O—CO—, —($CH_2$)$_r$—CO—$NR^2$—, —($CH_2$)$_r$—$NR^2$—CO—, —($CH_2$)$_r$—$NR^2$—, —($CH_2$)$_r$—O—($CH_2$)$_s$—, —($CH_2$)$_r$—CO—O—($CH_2$)$_s$—, —($CH_2$)$_r$—O—CO—($CH_2$)$_s$—, —($CH_2$)$_r$—$NR^2$—CO—($CH_2$)$_s$—, —($CH_2$)$_r$—$NR^2$—CO—O—($CH_2$)$_s$—, —($CH_2$)$_r$—O—($CH_2$)$_s$—O—, —($CH_2$)$_r$—CO—O—($CH_2$)$_s$—O—, —($CH_2$)$_r$—O—CO—($CH_2$)$_s$—O—, —($CH_2$)$_r$—$NR^2$—CO—($CH_2$)$_s$—O—, —($CH_2$)$_r$—$NR^2$—CO—O—($CH_2$)$_s$—O—, —($CH_2$)$_r$—O—($CH_2$)$_s$—CO—O—, —($CH_2$)$_r$—O—($CH_2$)$_s$—O—CO—, wherein r and s are each an integer from 1 to 20, but especially from 2 to 12, with the proviso that r+s≦21, especially ≦15, and wherein $R^2$ represents hydrogen or lower alkyl.

Examples of preferred "spacer units" $S^6$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy and the like.

Preferred "spacer units" $S^7$ and $S^{10}$ in the context of the present invention are a straight-chain or branched alkylene grouping, represented by —(CH$_2$)$_r$—, and also —O—(CH$_2$)$_r$—, —CO—(CH$_2$)$_r$—, —CO—O—(CH$_2$)$_r$—, —O—CO—(CH$_2$)$_r$—, —NR$^2$—CO—(CH$_2$)$_r$—, —NR$^2$—(CH$_2$)$_r$—, —CO—NR$^2$—(CH$_2$)$_r$—, —NR$^2$—CO—(CH$_2$)$_r$—, —O—(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^2$—CO—(CH$_2$)$_s$—, —(CH$_2$)$_r$—NR$^2$—CO—O—(CH$_2$)$_s$—, —O—(CH$_2$)$_r$—O—(CH$_2$)$_s$—, —O—(CH$_2$)$_r$—CO—O—(CH$_2$)$_s$—, —O—(CH$_2$)$_r$—O—CO—(CH$_2$)$_s$—, —O—(CH$_2$)$_r$—NR$^2$—CO—(CH$_2$)$_s$—, —O—(CH$_2$)$_r$—NR$^2$—CO—O—(CH$_2$)$_s$—, —O—CO—(CH$_2$)$_r$—O—(CH$_2$)$_s$—, —CO—O—(CH$_2$)$_r$—O—(CH$_2$)$_s$—, wherein r and s are each an integer from 1 to 20, but especially from 2 to 12, with the proviso that r+s≦21, especially ≦15, and wherein R$^2$ represents hydrogen or lower alkyl.

Examples of preferred "spacer units" $S^7$ and $S^{10}$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxypropylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene and the like.

Preferred "spacer units" $S^8$ and $S^9$ in the context of the present invention are a straight-chain or branched alkylene grouping, represented by —(CH$_2$)$_r$—, and also —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^2$—, —(CH$_2$)$_r$—NR$^2$—CO—, —(CH$_2$)$_r$—NR$^2$—, —O—(CH$_2$)$_r$—, —CO—O—(CH$_2$)$_r$—, —O—CO—(CH$_2$)$_r$—, —NR$^2$—CO—(CH$_2$)$_r$—, —CO—NR$^2$—(CH$_2$)$_r$—, —NR$^2$—(CH$_2$)$_r$—, —O—(CH$_2$)$_r$—CO—O—, —O—(CH$_2$)$_r$—O—CO—, —O—(CH$_2$)$_r$—CO—NR$^2$—, —O—(CH$_2$)$_r$—NR$^2$—, —O—(CH$_2$)$_r$—O—, —O—(CH$_2$)$_r$—NR$^2$—CO—, —NR$^2$—(CH$_2$)$_r$—CO—O—, —NR$^2$—(CH$_2$)$_r$—O—, —NR$^2$—(CH$_2$)$_r$—NR$^2$—, —NR$^2$—(CH$_2$)$_r$—O—CO—, —CO—NR$^2$—(CH$_2$)$_r$—O—, —CO—NR$^2$—(CH$_2$)$_r$—NR$^2$—, —CO—NR$^2$—(CH$_2$)$_r$—O—CO—, —O—CO—(CH$_2$)$_r$—CO—, —O—CO—(CH$_2$)$_r$—O—, —O—CO—(CH$_2$)$_r$—NR$^2$—, —O—CO—(CH$_2$)$_r$—CO—O—, —O—CO—(CH$_2$)$_r$—O—CO—(CH$_2$)$_s$—, —O—CO—(CH$_2$)$_r$—CO—NR$^2$—, —O—CO—(CH$_2$)$_r$—CO—(CH$_2$)$_s$—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^2$—CO—(CH$_2$)$_s$—, —(CH$_2$)$_r$—NR$^2$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^2$—CO—(CH$_2$)$_s$—O—, —(CH$_2$)$_r$—NR$^2$—CO—O—(CH$_2$)$_s$—O—, —O—(CH$_2$)$_r$—O—(CH$_2$)$_s$—, —O—(CH$_2$)$_r$—CO—O—(CH$_2$)$_s$—, —O—(CH$_2$)$_r$—NR$^2$—CO—(CH$_2$)$_s$—, —O—(CH$_2$)$_r$—NR$^2$—CO—O—(CH$_2$)$_s$—, —O—(CH$_2$)$_r$—O—(CH$_2$)$_s$—O—, —O—(CH$_2$)$_r$—O—CO—(CH$_2$)$_s$—O—, —O—(CH$_2$)$_r$—NR$^2$—CO—(CH$_2$)$_s$—O—, —CO—O—(CH$_2$)$_r$—O—(CH$_2$)$_s$—, —CO—O—(CH$_2$)$_r$—O—(CH$_2$)$_s$—O—, wherein r and s are each an integer from 1 to 20, but especially from 2 to 12, with the proviso that r+s≦21, especially ≦15, and wherein R$^2$ represents hydrogen or lower alkyl.

Examples of preferred "spacer units" $S^8$ and $S^9$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

The radicals K are divalent groups that can be derived from aliphatic, alicyclic or aromatic diamines by formal removal of the amino groups.

Preferred examples of such aliphatic and alicyclic diamines are:

ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 1,11-undecylenediamine, 1,12-dodecylenediamine, α,α'-diamino-m-xylene, α,α'-diamino-p-xylene, (5-amino-2,2,4-trimethylcyclopentyl)methylamine, 1,2-diaminocyclohexane, 4,4'-diaminodicyclohexylmethane, 1,3-bis(methylamino)cyclohexane, and 4,9-dioxadodecane-1,12-diamine.

Preferred examples of aromatic diamines are:

3,5-diaminobenzoic acid methyl ester; 3,5-diaminobenzoic acid hexyl ester, 3,5-diaminobenzoic acid dodecyl ester; 3,5-diaminobenzoic acid isopropyl ester;

4,4'-methylenedianiline; 4,4'-ethylenedianiline; 4,4'-diamino-3,3'-dimethyldiphenylmethane; 3,3',5,5'-tetramethylbenzidine; 4,4'-diaminodiphenyl sulfone; 4,4'-diaminodiphenyl ether; 1,5-diaminonaphthalene; 3,3'-dimethyl-4,4'-diaminobiphenyl;

3,4'-diaminodiphenyl ether; 3,3'-diaminobenzophenone; 4,4'-diaminobenzophenone;

4,4'-diamino-2,2'-dimethylbibenzyl; 2,2-bis[4-(4-aminophenoxy)phenyl]sulfone;

1,4-bis(4-aminophenoxy)benzene; 1,3-bis(4-aminophenoxy)benzene;

1,3-bis(3-aminophenoxy)benzene; 2,7-diaminofluorene; 9,9-bis(4-aminophenyl)fluorene; 4,4'-methylenebis(2-chloroaniline); 4,4-bis(4-aminophenoxy)biphenyl;

2,2',5,5'-tetrachloro4,4'-diaminobiphenyl; 2,2'-dichloro4, 4'-diamino-5,5'-dimethoxybiphenyl; 3,3'-dimethoxy-4, 4'-diaminobiphenyl; 4,4'-(1,4-phenyleneisopropylidene)bisaniline; 4,4'-(1,3-phenyleneisopropylidene)bisaniline; 2,2-bis[4-(4-aminophenoxy)phenyl]propane; 2,2-bis[3-(4-aminophenoxy)phenyl]hexafluoropropane; 2,2-bis[3-amino-4-methylphenyl]hexafluoropropane; 2,2-bis(4-aminophenyl)hexafluoropropane; 2,2'-bis[4-(4-amino-2-trifluoromethylphenoxy)phenyl]hexafluoropropane;

4,4'-diamino-2,2'-bis(trifluoromethyl)biphenyl; and 4,4'-bis[(4-amino-2-trifluoromethyl)phenoxy]-2,3,5,6,2',3', 5',6'-octafluorobiphenyl.

The divalent, trivalent or tetravalent group J serves essentially as a grouping for linking the polymer main chain to the side-chain, which comprises the whole of formula I except M. Two of the valencies in J serve as linkages, indicated in formulae III to VIII, via $S^6$ to $S^{10}$ within the main chain. The third and optionally the fourth valency serves as the linkage to one or two side-chain(s) of the formula I (formula 1 except M). The polymer chain may, however, also comprise building blocks of the formulae II to VIII in which the side-chain of formula I is absent, that is to say where the group J is merely divalent. The proportion of building blocks of the formulae III to VII in which J is divalent, that is to say in which there is no crosslinkable side-chain of the formula I present, is generally less than 75%, but preferably less than 50% and more especially less than 30%. Of the trivalent and tetravalent groups J that contain one or two crosslinkable side-chains of the formula I, the trivalent groups, that is to say those groups which are linked to only one crosslinkable side-chain of the formula I, are preferred.

The photoactive polymer of formula I may be a bomopolymer or a copolymer. However, we prefer it to be a copolymer.

Preferably at least 50% of the monomer building blocks forming the main chain of photoactive polymer of formula I are linked to one or two side-chains, which U comprises the whole of formula I except M. Especially preferred is a polymer in which at least 70% of the monomer building blocks forming the main chain are linked to one or two of the side-chains.

Preferably the monomer building blocks carrying a side-chain are each linked to only one side-chain.

The building blocks of the formulae IV, VI and VIII are amic acid groupings or amic acid ester groupings (i.e. carboxamide-carboxylic acid groupings or carboxamide-carboxylic acid ester groupings) which on the one hand may occur as a result of incomplete imidisation in the polyimide chain. On the other hand, polymers that consist only of building blocks of formulae IV, VI or VIII, that is to say polyamic acids or polyamic acid esters, are important precursors for the preparation of the polyimides according to the invention and are also included in the present invention. Of those polymers which contain groups of formulae IV, VI or VIII, preference is given to those in which G is hydrogen, that is to say those which consist exclusively of, or contain some, polyamic acid groups.

The term "phenylene" includes in the context of the present invention 1,2-, 1,3- or 1,4-phenylene that is unsubstituted or mono- or poly-substituted. Preference is given to 1,3- or 1,4-phenylene, but especially to 1,4-phenylene.

The expression "cyclic, straight-chain or branched alkyl residue which is unsubstituted or halogeno or polyhalogeno-substituted, having 1 to 12 carbon atoms and wherein one or more $CH_2$ groups may independently be replaced by —O—, —CO—, —CO—O—, —O—CO, —CH═CH—, —C≡C—, with the proviso that oxygen atoms are not directly attached to each other" denotes for example, methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, undecyl, dodecyl, 3-methylpentyl, allyl, but-3-en-1-yl, pent4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, decyloxy, undecyloxy, dodecyloxy, 3-methylpentyloxy, allyloxy, but-3-enyloxy, pent-4-enyloxy, cylohexylmethoxy, cyclopentylmethoxy, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, cyclopentyloxycarbonyl, hexyloxycarbonyl, cyclohexyloxycarbonyl, octyloxycarbonyl, nonyloxycarbonyl, decyloxycarbonyl, undecyloxycarbonyl, dodecyloxycarbonyl, 3-methylpentyloxycarbonyl, allyloxycarbonyl, but-3-enyloxycarbonyl, pent-4-enyloxycarbonyl, cylohexylnethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, hexylcarbonyloxy, cyclohexylcarbonyloxy, octylcarbonyloxy, nonylcarbonyloxy, decylcarbonyloxy, undecylcarbonyloxy, dodecylcarbonyloxy, 3-methylpentylcarbonyloxy, but-3-enyloxy, pent-4-enyloxy, acetyl, ethylcarbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octylcarbonyl, nonylcarbonyl, decylcarbonyl, undecylcarbonyl, dodecylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butyn-1-oxy, 4-pentyn-1-oxy, 5-chloro-1-pentyn, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadecafluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl. 1-fluoropropoxy, 1-fluoropentyloxy, 2-fluoropropoxy, 2,2-difluoropropoxy, 3-fluoropropoxy, 3,3-difluoropropoxy, 3,3,3-trifluoropropoxy, trifluoromethoxy and the like.

The term "aliphatic", unless the context requires otherwise, includes straight-chain and branched alkyl, as well as saturated and unsaturated groups. Possible substituents include alkyl, aryl (thus giving an araliphatic group) and cycloalkyl, as well as amino, cyano, epoxy, halogen, hydroxy, nitro, oxo etc. Possible heteroatoms which may replace carbon atoms include nitrogen, oxygen and sulphur. In the case of nitrogen further substitution is possible with groups such as alkyl, aryl and cycloalkyl.

The term "alkyl" likewise, unless the context requires otherwise, includes straight-chain and branched alkyl, as well as saturated and unsaturated groups.

The term "lower alkyl", denotes straight-chain and branched saturated hydrocarbon radicals having from 1 to 6, preferably from 1 to 3, carbon atoms, such as methyl ethyl, propyl or isopropyl and the like.

The term "aromatic" includes carbocylic and heterocyclic groups, either unsubstituted or substituted by one or more groups.

The side-chain polymers according to the invention can be present in the form of homopolymers as well as in the form of copolymers. The term "copolymers" is to be understood as meaning especially statistical copolymers.

The polymers of formula I are characterised by being readily accessible. The methods for the production will be known to a person skilled in the art.

The polymers of formula I, with acrylate, methacrylate and styrene derivative as repeating monomer unit, can be prepared in principle according to two different processes. In addition to the direct polymerisation of pre-finished monomers there exists the possibility of polymer-analogous reaction of reactive photoactive derivatives with functional polymers.

For the direct polymerisation, the monomers and the comonomers are firstly prepared separately from the individual components. The formation of the polymers is subsequently effected in a manner known per se under the influence of TV radiation or heat or by the action of radical or ionic catalysts. Potassium peroxodisulfate, dibenzoyl peroxide, azobisisobutyronitrile or di-tert-butyl peroxide are examples of radical initiators. Ionic catalysts are alkaliorganic compounds such as phenyllithium or naphthylsodium or Lewis acids such as $BF_3$, $AlCl_3$, $SnCl_3$ or $TiCl_4$. The monomers can be polymerised in solution, suspension, emulsion or substance.

In the second process a polymer of formula I can also be produced in a polymer-analogous reaction from a pre-finished functional polymer and a suitable functionalised photoactive derivative. Many known processes such as, for example, esterification, trans-esterification, amidation or the etherification are suitable for polymer-analogous reactions.

This polymers have a molecular weight $M_W$ between 1000 and 5 000 000, preferably however between 5 000 and 2 000 000, especially advantageously however between 10 000 and 1 000 000.

The preparation of the polyamic acids and polyimides according to the invention is generally carried out analogously to the methods frequently described in the polyimide literature, for example *Plast. Eng.* 36 (1996) (Polyimides, fundamentals and applications).

For example, the polycondensation reaction for the preparation of the polyamic acids is carried out in solution in a polar aprotic organic solvent, such as γ-butyrolactone, N,N-dimethylacetamide, N-methylpyrrolidone or N,N-dimethylformamide. In most cases equimolar amounts of the dianhydride and the diamine are used, that is to say one amino group per anhydride group. If it is desired to stabilise the molecular weight of the polymer, it is possible for that purpose to add an excess or a less-than-stoichiometric amount of one of the two components or to add a monofunctional compound in the form of a dicarboxylic acid monoanbydride or in the form of a monoamine. Examples of such monofunctional compounds are maleic acid anhydride, phthalic acid anhydride, aniline and so on. The reaction is carried out preferably at a temperature of less than 100° C.

The cyclisation of the polyamic acids to form the polyimides can be carried out by heating, that is to say by condensation with removal of water or by other imidisation reactions with reagents. When carried out purelythermally, the imidisation of the polyamic acids is not always complete, that is to say the resulting polyimides may still contain proportions of polyamic acid. The imidisation reactions are generally carried out at a temperature of from 60 to 250° C., but preferably at less than 200° C. In order to achieve imidisation at rather lower temperatures there are additionally mixed into the reaction mixture reagents that facilitate the removal of water. Such reagents are, for example, mixtures consisting of acid anhydrides, such as acetic acid anhydride, propionic acid anhydride, phthalic acid anhydride, trifluoroacetic acid anhydride, and tertiary amines, such as triethylamine, trimethylarmine, tributylamine, pyridine, N,N-dimethylaniline, lutidine, collidine etc. The amount of reagents used in that case is preferably at least two equivalents of amine and four equivalents of acid anhydride per equivalent of polyamic acid to be condensed.

The imidisation reaction can be carried out before or alternatively only after application to a support. The latter variant is preferred especially when the polyimide in question has poor solubility in the customary solvents.

The polyamic acids and the polyimides of the present invention has an intrinsic viscosity preferably in range of 0.05 to 10 dL/g, more preferably 0.05 to 5 dL/g. Herein, the intrinsic viscosity ($\eta_{inh}$=1n $\eta_{rel}$/C) is determined by measuring a solution containing a polymer in a concentration of 0.5 g/100 ml for its viscosity at 30° C. using N-methyl-2-pyrrolidone as solvent.

The number of monomer building blocks from which the polymer chains according to the invention are synthesised can vary within a wide range. It is generally from 2 to 2000, but especially from 3 to 200.

The polymer according to the invention may contain additives such as silane-containing compounds and epoxy-containing crosslinking agents for further improving the adhesion of the polymer to a substrate. Example for silane adhesion promoters were described in the literature, for example *Plast. Eng.* 36 (1996) (Polyimides, fundamentals and applications). The above epoxy-containing crosslinking agent preferably includes 4,4'-methylenebis(N,N-diglycidylaniline), trimethylolpropane triglycidyl ether, benzene-1,2,4,5-tetracarboxylic acid 1,2:4,5-N,N'-diglycidyldiimide, polyethylene glycol diglycidyl ether, N,N-diglycidylcyclohexylamine and the like.

The polymer according to the invention may contain additives such a photosensitiser, a photoradical generator and/or a cationic photoinitiator. Example for such additives were 2,2-dimethoxyphenylethanone, mixture of diphenylmethanone and N,N-dimethylbenzenamine or ethyl 4-(dimethylamino)benzoate, xanthone, thioxanthone, IRGACURE™ 184, 369, 500, 651 and 907 (Ciba), Michler's ketone, triaryl sulfonium salt and the like.

The polymers according to the invention may be used as a single polymer or as mixture with other polymers, oligomers, monomers, photoactive polymers, photoactive oligomers and/or photoactive monomers. Thus the properties of the layer may be modified to give what is sought. For example, an induced pretilt angles, good surface wetting, high voltage holding ratio, a specific anchoring energy etc. may be obtained.

The polymers according to the invention can then be applied to a support and, after any imidisation step which may be necessary, crosslinked by irradiation with linearly polarised light, that is to say by cycloaddition of their side-chains containing the photoreactive group, there being obtained, depending upon the direction of polarisation of the light radiated in, a preferred direction of orientation and of the angle of tilt for liquid crystals that are bought into contact with the orientation layer. By spatially selective irradiation of the molecular units according to the invention it is hence possible for very specific regions of a surface to be aligned and provided with a defined angle of tilt. At the same time the orientation layer so produced is also stabilised by the cycloaddition.

The present invention therefore relates also to the use of the polymers according to the invention as orientation layers for liquid crystals, and to their use in optical constictional elements, especially in the production of hybrid layer elements.

Such orientation layers can be produced, for example, by first preparing a solution of the resulting polymer material, which is applied to a support, which is optionally coated with an electrode (for example a glass plate coated with indium-tin oxide (ITO)), in a spin-coating apparatus, so that homogeneous layers of 0.05 to 50 μm thickness are produced. Then, or optionally after prior imidisation, the regions to be oriented can be irradiated, for example, with a high-pressure mercury vapour lamp, a xenon lamp or a pulsed TV laser, using a polariser and optionally a mask for creating images of structures. The irradiation time is dependent upon the output of the individual lamps and can vary from a few seconds to several hours. The dimerisation can also be carried out, however, by irradiation of the homogeneous layer using filters that, for example, allow only the radiation suitable for the crosslinking reaction to pass through.

Further aspects of the present invention are:

a) Optical or electro-optical devices having at least one orientation layer, characterised in that the orientation layer contains polymers according to formula I; and b) Use of polymer according formula I in the construction of unstructured and structured optical elements and multi-layer systems.

The polymers in accordance with the invention are illustrated in more detail by the following Examples. In the Examples hereinafter $T_g$ signifies the glass temperature, C signifies the crystalline phase, N signifies the nematic phase I signifies the isotropic phase and p signifies the number of repeating units in the polymer. Relative molecular weights were determined by gel permeation chromatography (GPC) at 35° C. using THF as solvent with polystyrene standard.

EXAMPLE 1 poly-[1-[11-[5-[4-[(E)-2-Methoxycarbonylvinyl]
benzoyloxy]-2-(4-propylbenzoyloxy)benzoyloxy]
undecyloxycarbonyl]-1-methylethylene]

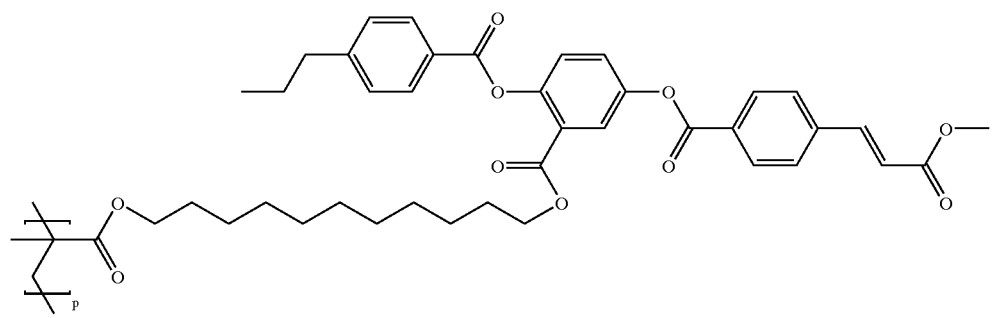

A mixture of 0.89 g (1.22 mmol) (E)-5-[4-(2-methoxycarbonylvinyl)benzoyloxy]-2-(4-propylbenzoyloxy)benzoic acid 11-(2-methylacryloyloxy) undecyl ester and 2.0 mg (0.012 mmol) α,α'-azoisobutyronitrile (AIBN) in 2.45 ml dry tetrahydrofuran (THF) was degassed in a sealable tube. The tube was then sealed under argon and stirred at 60° C. for 17 h. The polymer was diluted with 2.5 ml THF, precipitated into 500 ml diethyl ether and collected. The polymer was reprecipitated from THF (7.0 ml) into 750 ml methanol to yield 0.71 g (80%) poly-[1-[11-[5-[4-[(E)-2-methoxycarbonylvinyl] benzoyloxy]-2-(4-propylbenzoyloxy)benzoyloxy] undecyloxycarbonyl]-1-methylethylene] as a hard solid;

$M_n$=7.4×10$^4$, pdi=6.59, Tg=49.5° C., cl.p. (N/I) 127.3° C.

The (E)-5-[4-(2-methoxycarbonylvinyl)benzoyloxy]-2-(4-propylbenzoyloxy)benzoic acid 11-(2-methylacryloyloxy)undecyl ester used as starting material was prepared in accordance with the following procedure:

(E)4-Carboxyl Cinnamic Acid Methyl Ester

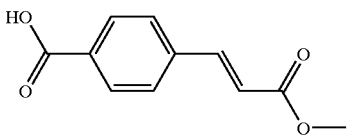

10.0 g (66.6 mmol) 4-carboxybenzaldehyde were dissolved in 100 ml toluene and 23.6 g (69.9 mmol) [(methoxycarbonyl)methyl]triphenylphosphorane were added. The reaction was slightly exothermic. The thick suspension was diluted with 50 ml toluene. After 18 h at room temperature the product was collected by filtration and was digest in 100 ml isopropyl alcohol at reflux temperature for 1 hour. The solid was then filtered off at 0° C., dried overnight at 45° C. under vacuum, resulting in 8.9 g (65%) (E)-4-carboxyl cinnamic acid methyl ester as white powder.

2-Methylacrylic Acid 11-Bromoundecyl Ester

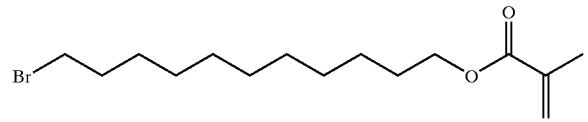

19.2 g (76.4 mmol) 11-bromo-1-undecanol, 7.2 g (84.1 mmol) methacrylic acid and 1.03 g (8.4 mmol) 4-dimethylaminopyridine were dissolved in 157 ml dichloromethane. The solution was subsequently cooled to 0° C. and then a solution of 17.4 g (84.2 mmol) dicyclohexylcarbodiimide in 80 ml dichloromethane was added dropwise, in the course of 45 minutes at 0° C. The reaction was allowed to warm to room temperature, stirred for 19 hours and filtered. The filtrate was concentrated by evaporation. Chromatography of the residue on 170 g silica gel using toluene yielded 19.3 g (98.4%) 2-methylacrylic acid 11-bromoundecyl ester.

2,5-Dihydroxybenzoic Acid 11-(2-Methylacryloyloxy)ester

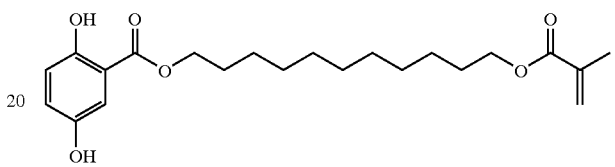

8.46 g (54.9 mmol) 2,5-dihydroxybenzoic acid was suspended in 55 ml acetonitrile. 8.24 ml (54.9 mmol) 1,8-diazabicyclo[5.4.0]undec-7-ene(1,5-5) (DBU) were added dropwise in the course of 10 minutes. The reaction temperature rise to 40° C. 19.3 g (60.4 mmol) 2-methyl-acrylic acid 11-bromo-undecyl ester were added by room temperature and the mixture was then heated at reflux temperature for 17.5 hours. The reaction mixture was cooled and then partitioned between diethyl ether and water; the organic phase was washed with water, with 1N sulfuric acid and again with water, dried over sodium sulfate, filtered and concentrated by rotary evaporation. The residue was recrystallised, first form a mixture of ethyl acetate (17 ml) and hexane (100 ml) and again form a mixture of tert-butyl methyl ether (50 ml) and hexane (100 ml) to yield 17.1 g (79%) 2,5-dihydroxybenzoic acid 11-(2-methylacryloyloxy) ester as white crystals.

(E)-2-Hydroxy-5-[4-(2-methoxycarbonylvinyl)benzoyloxy] benzoic Acid 11-(2-Methylacryloyloxy)undecyl Ester

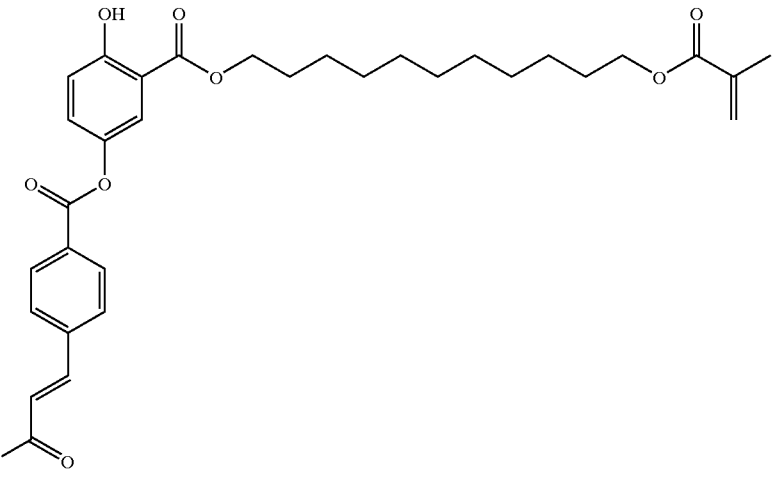

4.76 g (12.1 mmol) 2,5-dihydroxybenzoic acid 11-(2-methylacryloyloxy)ester, 2.50 g (12.1 mmol) (E)4carboxyl cinnamic acid methyl ester and 0.37 g (3.0 mmol) 4-dimethylaminopyridine were dissolved in 30 ml of dichlotomethane. A suspension of 2.32g (12.1 mmol) N-(3-dimethylaminopropyl)N'-ethylcarbodiimide hydrochloride and 25 ml dichloromethane were added dropwise in the course of 1 hour. After 1.5 hour at room temperature the reaction mixture was partitioned between dichloromethane and water; the organic phase was washed repeatedly with water, dried over sodium sulfate, filtered and concentrated by rotary evaporation. Chromatography of the residue on 240 g silica gel using cyclohexane:ethyl acetate 9:1 yielded 6.1 g (87%) (E)-2-hydroxy-5-[4-(2-methoxycarbonylvinyl)benzoyloxy]benzoic acid 11-(2-methylacryloyloxy)-undecyl ester as white powder, m.p.=51° C.

(E)-5-[4-(2-Methoxycarbonylvinyl)benzoyloxy]-2-(4-propylbenzoyloxy)benzoic acid 11-(2-methylacryloyloxy) undecyl ester

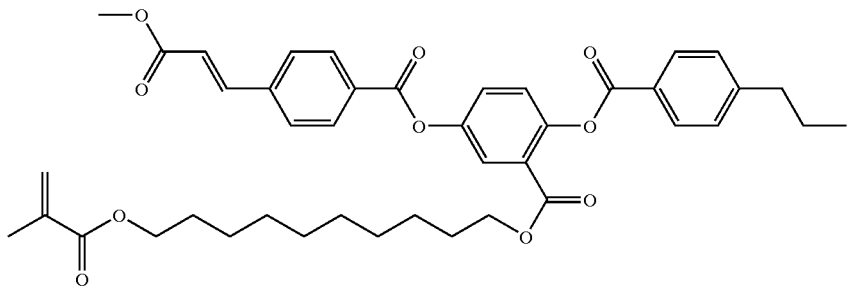

1.0 g (1.72 mmol) (E)-2-hydroxy-5-[4-(2-methoxycarbonylvinyl)benzoyloxy]benzoic acid 11-(2-methylacryloyloxy)undecyl ester, 0.37 g (2.24 mmol) 4-propylbenzoic acid and 58 mg (0.47 mmol) 4-dimethylaminopyridine were dissolved in 20 ml of dichloromethane. A suspension of 0.43g (2.24 mmol) N-(3-dimethylaminopropyl)-N'-ethylcarbodiimide hydrochloride and 10 ml dichloromethane were added dropwise in the course of 45 minutes. After 65 hour at room temperature the reaction mixture was partitioned between dichloromethane and water; the organic phase was washed repeatedly with water, dried over sodium sulfate, filtered and concentrated by rotary evaporation. Chromatography of the residue on 120 g silica gel using cyclohexane:ethyl acetate 4:1 and subsequent crystallisation form 50 ml isopropyl alcohol yielded 0.99 g (79%) (E)-5-[4-(2-methoxycarbonylvinyl) benzoyloxy]-2-(4-propylbenzoyloxy)benzoic acid 11-(2-methylacryloyloxy)undecyl ester as white powder, m.p. (C/N) 86.8° C., cl.p (N/I) 102.8° C.

The following compounds were prepared in an analogous manner:

Poly[1-[11-[5-[4-[(E)-2-methoxycarbonylvinyl]benzoyloxy]-2-(4-pentylbenzoyloxy)benzoyloxy]undecyloxycarbonyl]-1-methylethylene], $M_n$=6.9×10$_4$, pdi=5.08, Tg=45.9° C., cl.p (N/I) 127.3° C.

Poly[1-[11-[5-[4-[(E)-2-methoxycarbonyl-vinyl]-benzoyloxy]-2-(4-heptylbenzoyloxy)benzoyloxy]-undecyloxycarbonyl]-1-methylethylene], $M_n$=1.00× 10$^5$, pdi=7.04, Tg=41.7° C., cl.p. (N/I) 123.6° C.

Poly[1-[11-[5-[4-[(E)-2-methoxycarbonylvinyl]benzoyloxy]-2-(4-propylcyclohexanoyloxy)benzoyloxy]undecyloxycarbonyl]-1-methyl ethylene], $M_n$=7.2×10$^4$, pdi=4.29, Tg=45.4° C., cl.p. (N/I) 113.6° C.

Poly-[1-[8-[5-[4-[(E)-2-methoxycarbonylvinyl]benzoyloxy]-2-(4-propylbenzoyloxy)benzoyloxy]octyloxycarbonyl]-1-methylethylene], Mn=1.68×10$^5$, pdi=2.96, Tg=62.7° C., cl.p (N/I) 138.8° C.

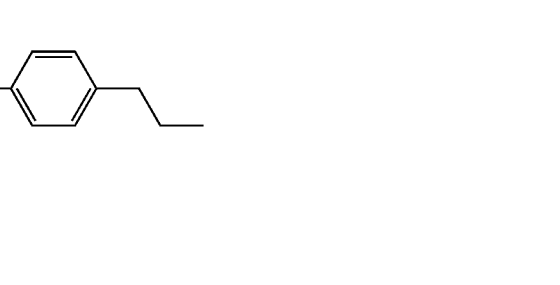

Poly-[1-[6-[5-[4-[(E)-2-methoxycarbonylvinyl]benzoyloxy]-2-(4-propylbenzoyloxy)benzoyloxy]hexyloxycarbonyl]-1-methylethylene], Mn=1.17×10$^5$, pdi=2.61, Tg=62.7° C., cl.p (N/I) 138.8° C.

Poly-[1-[11-[2-[4-[(E)-2-metboxycarbonylvinyl]benzoyloxy]-5-(4-propylbenzoyloxy)benzoyloxy]undecyloxycarbonyl]-1-methylethylene], Mn=4.7×10$^4$, pdi=2.31, Tg=54.8° C., cl.p (N/I) 124.3° C.

EXAMPLE 2 poly-[1-11-[2-[4-Pentylbenzoyloxyl-5-[6-[2-methoxy-4-(metboxycarbonylvinyl)phenoxy]oxyhexyl]benzoyloxy]undecyloxycarbonyl]-1-methylethylene]

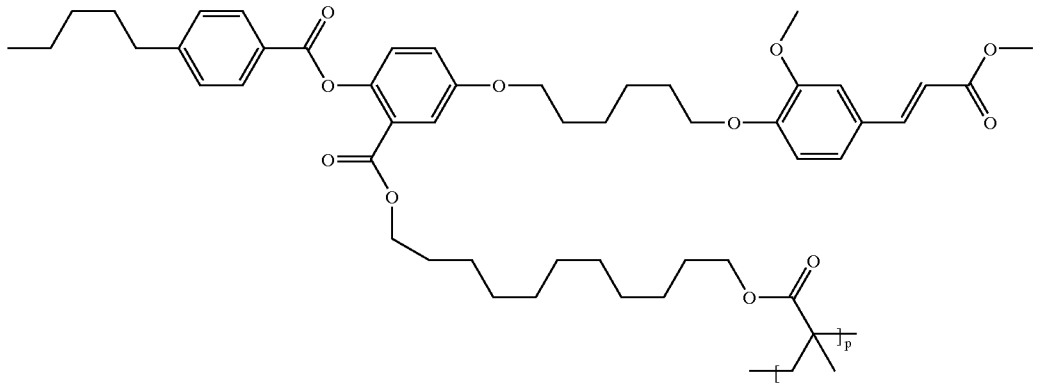

Preparation was carried out analogously to Example 1 using 1.0 g (1.17 mmol) (E)-2-[4-pentylbenzoyloxy]-5-[6-[2-methoxy-4-(methoxycarbonylvinyl)phenoxy]oxyhexyl]

bepzoic acid 11-(2-methylacryloyloxy)undecyl ester yielding 0.84 g (84%) poly-[1-[11-[2-[4-pentylbenzoyloxy]-5-[6-[2-methoxy-4-(methoxycarbonylvinyl)phenoxy]oxyhexyl]benzoyloxy]undecyloxycarbonyl]-1-methylethylene] as hard solid; $M_n = 7.3 \times 10^4$, pdi=4.40, Tg=34.0° C., cl.p. (N/I) 54.2° C.

The (E)-2-[4-pentylbenzoyloxy]-2-[5-[2-methoxy-4-(methoxycarbonylvinyl)phenoxy]oxyhexyl]benzoic acid 11-(2-methylacryloyloxy)undecyl ester used as starting material was prepared in accordance with the following procedure:

(E)-4-Hydroxy-3-methoxycinnamic Acid Methyl Ester

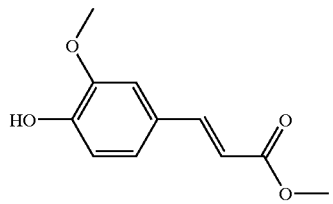

25 g (0.13 mol) of (E)4-hydroxy-3-methoxycinnamic acid were dissolved in 180 ml of methanol, and 5 ml of concentrated sulfuric acid were added. The solution was heated under reflux for 2 hours. The main amount of the methanol (about 150 ml) was then distilled off and the residue that remained was poured into 500 ml of ice-water. The precipitated ester was filtered off with suction, washed in succession with cold water, with a small amount of a cold saturated sodium bicarbonate solution and again with cold water and dried at 50° C. under a water-jet vacuum. Chromatography on 250 g of silica gel using dichloromethane:diethyl ether (19:1) yielded 21.78 g of (E)4-hydroxy-3-methoxycinnamic acid methyl ester in the form of a light-yellow oil.

(E)4-(6-Hydroxyhexyloxy)-3-methoxycinnamic Acid Methyl Ester

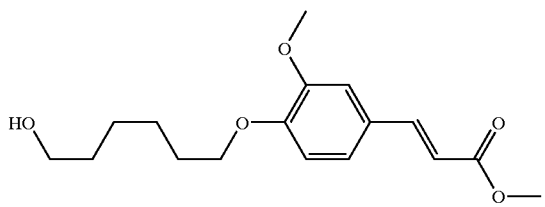

3.92 ml (25.2 mmol) of 1,6-hexanediol vinyl ether were added to a solution of 5.0 g (24.0 mmol) of (E)-4-hydroxy-3-methoxycinnamic acid methyl ester and 6.61 g (25.2 mmol) of triphenylphosphine in 150 ml of tetrahydrofuran. The colourless solution was subsequently cooled to 0° C. and then 11.5 ml (25.3 mmol) of a 40% solution of azodicarboxylic acid diethyl ester in toluene were added dropwise thereto in the course of 30 minutes. The mixture was subsequently allowed to react first for minutes at 0° C. and then for 22.5 hours at room temperature. 150 ml of methanol and 10 drops of concentrated sulfuric acid were then added to the reaction solution and the mixture was stirred for 1.5 hours. The reaction mixture was then partitioned between ethyl acetate and water; the organic phase was washed with a saturated sodium bicarbonate solution and repeatedly with saturated sodium chloride solution, dried over magnesium sulfate, filtered and concentrated by evaporation. Chromatography of the residue on 470 g of silica gel using toluene:ethyl acetate 1:1 and subsequent crystallisation from ethyl acetate:hexane 3:5 yielded 6.13 g of 4-(6-hydroxyhexyloxy)-3-methoxycinnamic acid methyl ester.

(E)-2-Hydroxy-5-[6-[2-methoxy-4-(methoxycarbonylvinyl)phenoxy]oxyhexyl]benzoic Acid 11-(2-Methylacryloyloxy)undecyl Ester

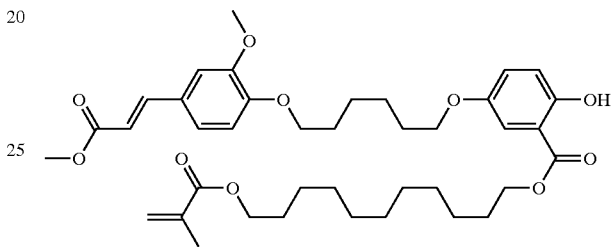

1.27 g (3.24 mmol) 2,5-dihydroxybenzoic acid 11-(2-methylacryloyloxy)ester, 1.0 g (3.24 mmol) 4-(6-hydroxyhexyloxy)-3-methoxycinnamic acid methyl ester and 0.89 g (3.40 mmol) of triphenylphosphine in 20 ml of tetrahydrofuran. The colourless solution was subsequently cooled to 0° C. and then 1.48 ml (3.40 mmol) of a 40% solution of azodicarboxylic acid diethyl ester in toluene were added dropwise thereto in the course of 10 minutes. The mixture was subsequently allowed to react for 3 hours at 0° C. The reaction mixture was then partitioned between ethyl acetate and water; the organic phase was washed with repeatedly with saturated sodium chloride solution, dried over magnesium sulfate, filtered and concentrated by evaporation. The residue was digest in a mixture form methanol and water 3:2. The solid was then filtered off and dried overnight at 45° C. under vacuum. Chromatography of the solid on 150 g of silica gel using toluene:ethyl acetate 1:1 yielded 1.45 g (65%) of (E)-2-hydroxy-5-[6-[2-methoxy-4-(methoxycarbonylvinyl)phenoxy]oxyhexyl]benzoic acid 11-(2-methylacryloyloxy)undecyl ester as colourless oil.

(E)-2-[4-pentylbenzoyloxy]-5-[6-[2-methoxy-4-(methoxycarbonylvinyl)phenoxy] oxyhexyl]benzoic acid 11-(2-methylacryloyloxy)undecyl Ester

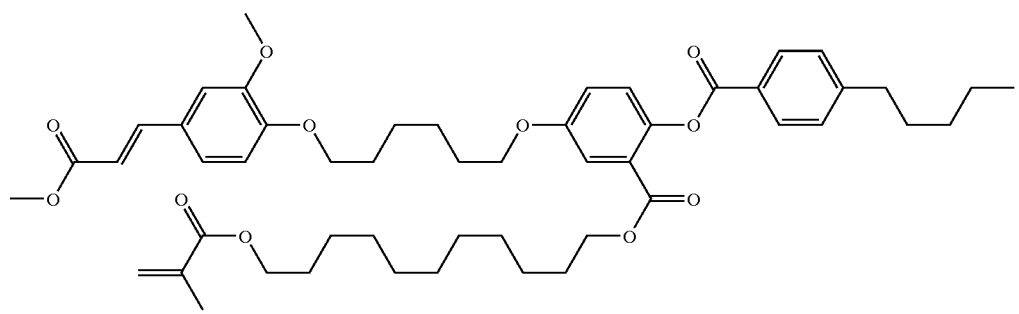

1.43 g (2.09 mmol) (E)-2-hydroxy-5-[6-[2-methoxy-4-(methoxycarbonylvinyl)phenoxy]oxyhexyl]benzoic acid 11-(2-methylacryloyloxy)undecyl ester, 0.42 g (2.20 mmol) 4-pentylbenzoic acid and 64 mg (0.52 mmol) 4-dimethylaminopyridine were dissolved in 30 ml of dichloromethane. A suspension of 0.42 g (2.20 mmol) N-(3-dimethylaminopropyl)-N'-ethylcarbodiimide hydrochloride and 3 ml dichloromethane were added dropwise in the course of 15 minutes. After 20 hour at room temperature the reaction mixture was partitioned between dichloromethane and water; the organic phase was washed repeatedly with water, dried over sodium sulfate, filtered and concentrated by rotary evaporation. Chromatography of the residue on 150 g silica gel using cyclohexane:ethyl acetate 4:1 and subsequent crystallisation form 20 ml isopropyl alcohol yielded 1.40 g (78%) (E)-2-[4-pentylbenzoyloxy]-5-[6-[2-methoxy-4-(methoxycarbonylvinyl)phenoxy]oxyhexyl]benzoic acid 11-(2-methylacryloyloxy)undecyl ester as white crystals.

EXAMPLE 3

Polyimide 96.6 mg (0.493 mmol) of 1,2,3,4-cyclobutantetracarboxylic acid dianhydride was added to a solution of 0.434 g (0.547 mmol) of 3,5-diaminobenzoic acid 11-[2-[4-pentylbenzoyloxy]-5-[4-(2-methoxycarbonylvinyl)benzoyloxy]benzoyloxy]undecyl ester in 3 ml of tetrahydrofuran. Stirring was then carried out at 0° C. for 2 hours. 10.7 mg (0.055 mmol)) of 1,2,3,4-cyclobutantetracarboxylic acid dianhydride were added. The mixture was subsequently allowed to react for 69 hours at room temperature. The polymer mixture was diluted with 3.0 ml THF, precipitated into 150 ml diethyl ether and collected. The polymer was reprecipitated form TBIF (10 ml) into 500 ml water to yield, after drying at room temperature under vacuum, 0.51 g of polyamic acid A in the form of a beige powder; [η]=0.51 dL/g.

The 3,5-diaminobenzoic acid 1-[2-[4-pentylbenzoyloxy]-5-[4-(2-methoxycarbonylvinyl)benzoyloxy]benzoyloxy] undecyl ester used as starting material was prepared in accordance with the following procedure:

3,5-Dinitrobenzoic Acid 11-Bromoundecyl Ester

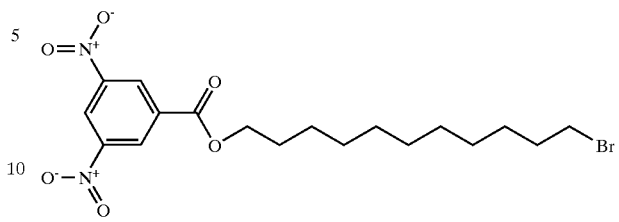

11.4 g (45.4 mmol) 11-bromo-1-undecanol, 11.0 g (47.7 mmol) 3,5-dinitrobenzoyl chloride, 54 mg 4-dimethylaminopyridine were dissolved in 94 ml dichloromethane. The solution was subsequently cooled to 0° C. and then 18.3 ml (227 mmol) Pyridine was added dropwise, in the course of 25 minutes. After 4.5 hours at 0° C. the reaction mixture was partitioned between dichloromethane and water; the organic phase was washed repeatedly with water, dried over sodium sulfate, filtered and concentrated by rotary evaporation. Chromatography of the residue on 200 g silica gel using Toluene yielded 18.1 g (90%) 3,5-Dinitrobenzoic acid 11-bromoundecyl ester as yellow powder.

3,5-Dinitrobenzoic Acid 11-[12,5-Dihydroxybenzoyloxy] undecyl Ester

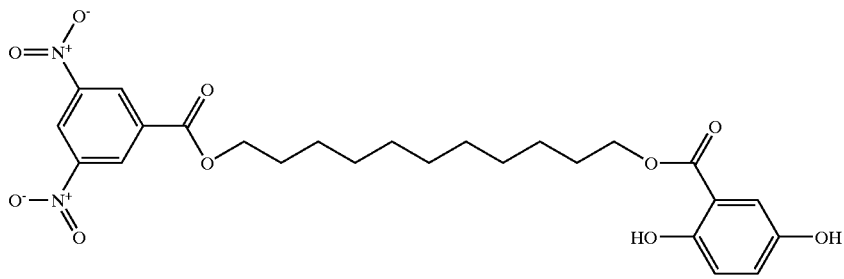

2.78 g (18.0 mmol) 2,5-dihydroxybenzoic acid were dissolved in 36 ml dimethylformamide. 2.96 ml (19.8 mmol) 1,8-diazabicyclo[5.4.0]undec-7-ene(1,5-5) (DBU) were added dropwise in the course of 15 minutes. The reaction temperature rise to 30° C., subsequently 8.83 g (19.8 mmol) 3,5-dinitrobenzoic acid 11-bromoundecyl ester were added in one portion. The mixture was then heated at 80° C. for 2 hours. The reaction mixture was cooled and then partitioned between dichloromethane and 1N hydrochloric acid, the organic phase was washed twice with water, dried over sodium sulfate, filtered and concentrated by rotary evaporation. Chromatography of the residue on 200 g silica gel using Toluene yielded 5.28 g (57%) 3,5-dinitrobenzoic acid 11-[2,5-dihydroxybenzoyloxy]undecyl ester as yellow powder.

3,5-Dinitrobenzoic Acid 11-[2-Hydroxy-5-[4-(2-methoxycarbonylvinyl)benzoyloxy]benzoyloxy]undecyl Ester

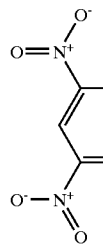

2.50 g (4.82 mmol) 3,5-Dinitrobenzoic acid 11-[2,5-dihydroxybenzoyloxy]undecyl ester, 0.99 g (4.82 mmol) (E)-4-carboxyl cinnamic acid methyl ester and 0.15 g (1.20 mmol) 4-dimethylaminopyridine were dissolved in 12 ml of dichloromethane. A suspension of 0.92 g (4.82 mmol) N-(3-dimethylaminopropyl)-N'-ethylcarbodiimide hydrochloride and 10 ml dichloromethane were added dropwise in the course of 45 minutes. After 3 hours at room temperature the reaction mixture was partitioned between dichloromethane and water; the organic phase was washed repeatedly with water, dried over sodium sulfate, filtered and concentrated by rotary evaporation. Chromatography of the residue on 100 g silica gel using toluene yielded 2.63 g (77%) 3,5-dinitrobenzoic acid 11-[2-hydroxy 5-[4-(2-methoxycarbonyl-vinyl)benzoyloxy]benzoyloxy]undecyl ester as yellow powder.

3,5-Dinitrobenzoic Acid 11-[2-[4-Pentylbenzoyloxy]-5-[4-(2-methoxycarbonylvinyl)benzoyloxy]benzoyloxy]undecyl Ester 1.31 g (1.86 mmol) 3,5-dinitrobenzoic acid 11-[2-[4-pentylbenzoyloxy]-5-[4-(2-methoxycarbonylvinyl)benzoyloxy]benzoyloxy]undecyl ester, 0.34 g (2.05 mmol) 4-propylbenzoic acid and 63 mg (0.51 mmol) 4-dimethylaminopyridine were dissolved in 26 ml of dichloromethane. A suspension of 0.39 g (2.05 mmol) N-(3-dimethylaminopropyl)-N'-ethylcarbodiimide hydrochloride and 11 ml dichloromethane were added dropwise in the course of 40 minutes. After 27.5 hour at room temperature the reaction mixture was partitioned between dichloromethane and water; the organic phase was washed repeatedly with water, dried over sodium sulfate, filtered and concentrated by rotary evaporation. Chromatography of the residue on 50 g silica gel using first toluene then toluene: ethyl acetate and subsequent crystallisation form 300 ml isopropyl alcohol yielded 1.23 g (77%) 3,5-dinitrobenzoic acid 11-[2-[4-pentylbenzoyloxy]-5-[4-(2-methoxycarbonylvinyl)benzoyloxy]benzoyloxy]undecyl ester as white crystals.

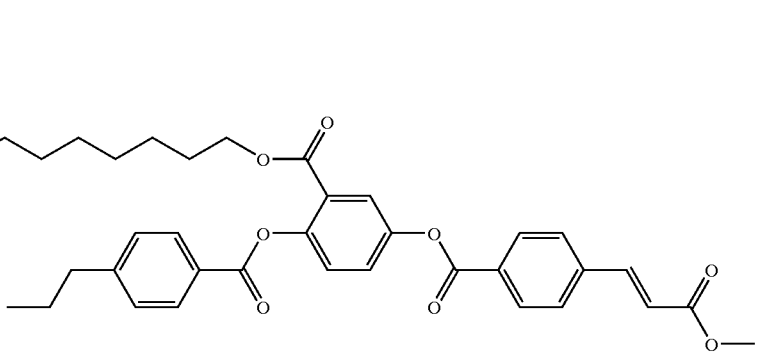

3,5-Diaminobenzoic Acid 11-[2-[4-Pentylbenzoyloxy]-5-[4-(2-metboxycarbonylvinyl)benzoyloxy]benzoyloxy]undecyl Ester

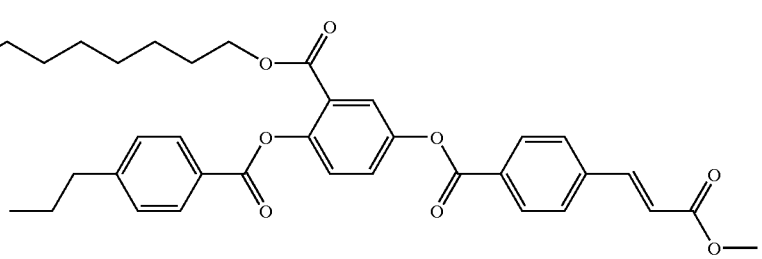

1.23 g (1.44 mmol) of 3,5-dinitrobenzoic acid 11-[2-[4-pentylbenzoyloxy]-5-[4-(2-methoxycarbonyl-vinyl)benzoyloxy]benzoyloxy]undecyl ester and 0.31 g (5.76 mmol) of ammonium chloride were suspended in 15 ml of a mixture consisting of methanol:water 9:1. 1.88 g (28.8 mmol) of zinc were then added in one portions. After 0.5 hour at room temperature 20 ml of a mixture consisting of methanol:water 9:1 were added to the thick suspension. After a further 21 hours the reaction suspension was partitioned between dichloromethane and water. The resulting suspension was filtered, the organic phase was washed with a saturated sodium bicarbonate solution and repeatedly with water. The organic phase was then dried over sodium sulfate, filtered and concentrated by evaporation. Chromatography of the residue on 25 g of silica gel using toluene, toluene-:ethyl acetate 9:1 and toluene:ethyl acetate 1:1 and subsequent twice crystallisation form a mixture of 5 ml ethyl acetate and 3.5 ml hexane yielded 0.434 g (38%) of 3,5-diaminobenzoic acid 11-[2-[4-pentylbenzoyloxy]-5-[4-(2-metboxycarbonylvinyl)benzoyloxy]benzoyloxy]undecyl ester as yellow crystals.

EXAMPLE 4

Copolymer Example
poly-[1-[11-[5-[4-[(E)-2-Methoxycarbonylvinyl]benzoyloxy]-2-(4-propylbenzoyloxy)benzoyloxy]undecyloxycarbonyl]-1-methylethylene-co-1-[11-[5-[4-[((E)-2-methoxycarbonylvinyl]benzoyloxy]-2-(4-pentylbenzoyloxy)benzoyloxy]undecyloxycarbonyl]-1-methylethylene]

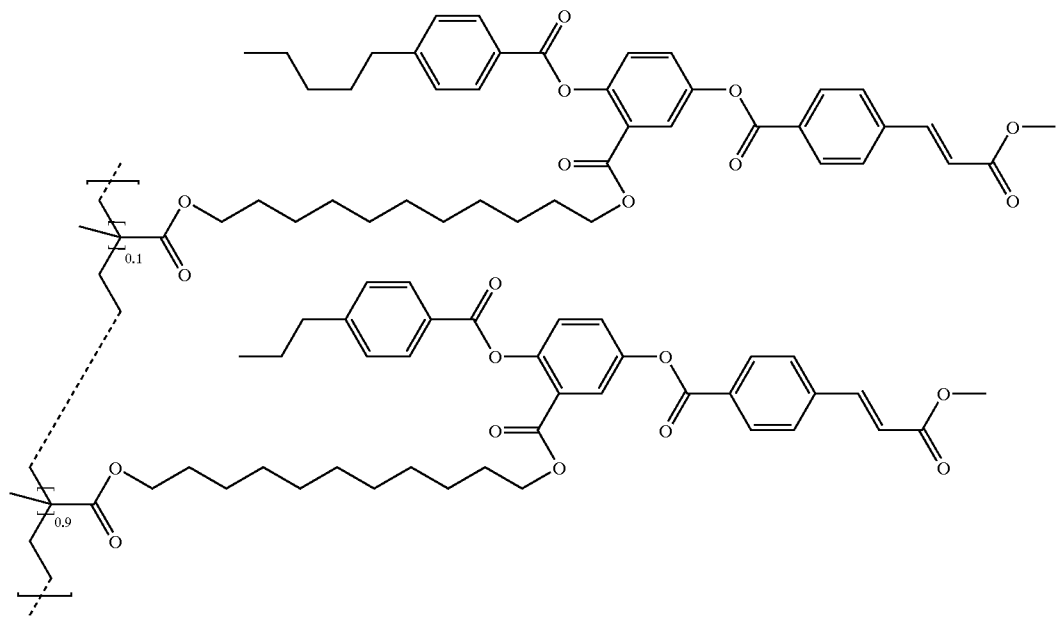

Preparation can be carried out analogously to Example 1 using 0.89 g (1.22 mmol) (E)-5-[4-(2-methoxycarbonylvinyl)benzoyloxy]-2-(4-propylbenzoyloxy)benzoic acid 11-(2-methylacryloyloxy)undecyl ester, 0.10 (0.13 mmol) (E)-5-[4-(2-methoxycarbonylvinyl)benzoyloxy]-2-(4-pentylbenzoyloxy)benzoic acid 11-(2-methylacryloyloxy)undecyl ester and (0.013 mmol) α,α'-azoisobutyronitrile yield poly-[1-[11-[5-[4-[(E)-2-methoxycarbonylvinyl]benzoyloxy]2-(4-propylbenzoyloxy)benzoyloxy]undecyloxycarbonyl]1-methyl ethylene-co-1-[11-[5-[4-[((E)-2-Methoxycarbonylvinyl]benzoyloxy]-2-(4-pentyllbenzoyloxy)benzoyloxy]undecyloxycarbonyl]-1-methylethylene].

The following copolymers can be synthesis in a analogous manner:

Poly-[1-[11-[5-[4-[(E)-2-methoxycarbonylvinyl]benzoyloxy]-2-(4-propylbenzoyloxy)benzoyloxy]undecyloxycarbonyl]-1-methylethylene-co-1-[11-[5-[4-[((E)-2-methoxycarbonylvinyl]benzoyloxy]-2-(4-heptylbenzoyloxy)benzoyloxy]undecyloxycarbonyl]-1-methylethylene]

Poly-[1-[11-[5-[4-[(E)-2-methoxycarbonylvinyl]benzoyloxy]-2-(4-pentylbenzoyloxy)benzoyloxy]undecyloxycarbonyl]-1-methylethylene-co-1-[11-[5-[4-[((E)-2-methoxycarbonylvinyl]benzoyloxy]-2-(4-heptylbenzoyloxy)benzoyloxy]undecyloxycarbonyl]-1-methylethylene]

Poly-[1-[11-[5-[4-[(E)-2-metboxycarbonylvinyl]benzoyloxy]-2-(4-propylbenzoyloxy)benzoyloxy]undecyloxycarbonyl]-1-methylethylene-co-1-[11-[5-[4-[((E)-2-methoxycarbonylvinyl]benzoyloxy]-2-(4-propylcyclohexanoyloxy)benzoyloxy]undecyloxycarbonyl]-1-methylethylene]

Poly-[1-[8-[5-[4-[(E)-2-methoxycarbonylvinyl]benzoyloxy]-2-(4-propylbenzoyloxy)benzoyloxy]octyloxycarbonyl]-1-methylethylene-co-1-[8-[5-[4-[((E)-2-methoxycarbonylvinyl]benzoyloxy]-2-(4-heptylbenzoyloxy)benzoyloxy]octyloxycarbonyl]-1-methylethylene]

Poly-[1-[8-[5-[4-[(E)-2-methoxycarbonylvinyl]benzoyloxy]-2-(4-propylbenzoyloxy)benzoyloxy]octyloxycarbonyl]-1-methylethylene-co-1-[11-[5-[4-[((E)-2-methoxycarbonylvinyl]benzoyloxy]-2-(4-heptylbenzoyloxy)benzoyloxy]undecyloxycarbonyl]-1-methylethylene]

EXAMPLE 5

A two percent by weight solution S1 of the photoreactive polymer A was prepared using cyclopentanone as a solvent. The solution was stirred for 30 minutes at room temperature.

Photopolymer A:

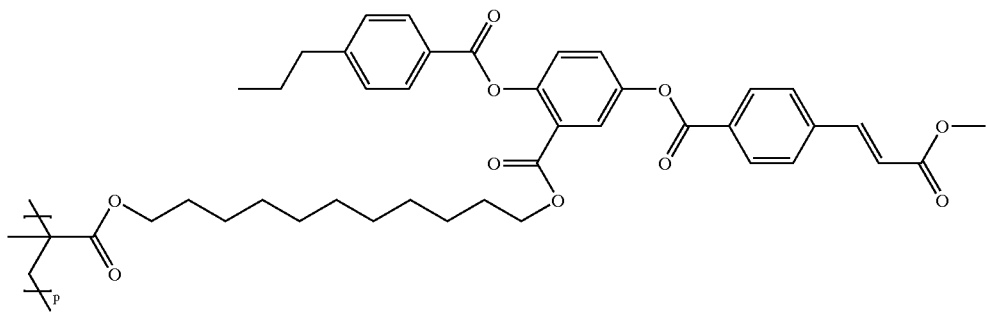

Solution S1 was spin-coated at 2000 rpm onto two ITO (indium-tin oxide) coated glass plates, which were then dried for 10 minutes at 180° C.

Both substrates were subsequently exposed for six minutes to the polarised ultraviolet light from a 200W high pressure mercury lamp. The intensity of the UV-light, mea- Mon1:

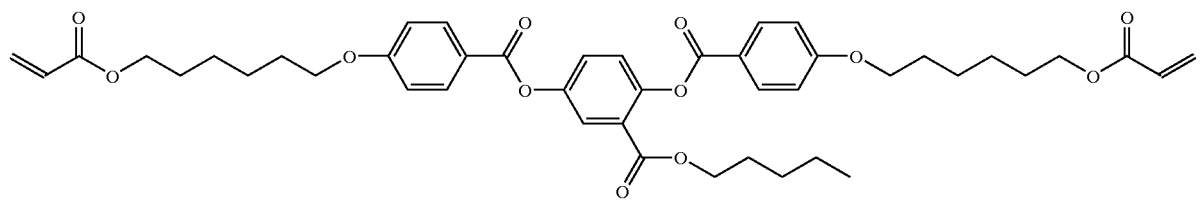

Mon2:

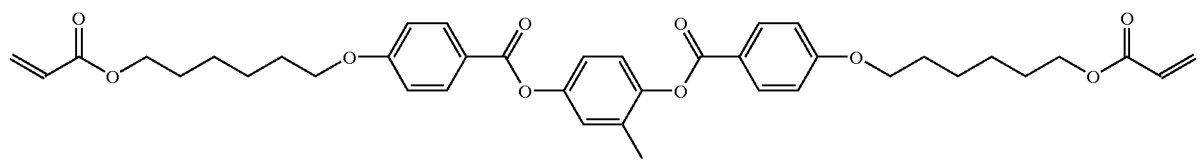

Mon3:

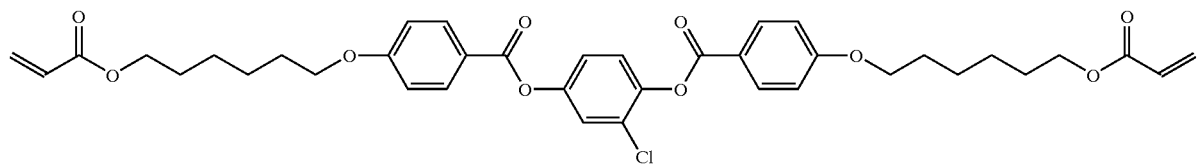

sured in a surface perpendicular to the propagation of the light was 1.6 mW/cm². A film polariser HNP'B by Polaroid was used to polarise the UV-light. During irradiation the substrates were TILTED BY 70° resective to the direction of the incoming light.

With the coated sides facing inwards, the two plates were assembled into a parallel cell, using a glass fibre of 20 µm as a spacer. The cell was immediately filled with a nematic liquid crystal mixture MLC12000-000 (Merck) at a temperature only just above the nematic-isotropic transition temperature of 89° C. After filling the cell was slowly cooled.

Using the crystal rotation technique, the pretilt angle in the above liquid crystal cell was determined as 88°.

EXAMPLE 6

A mixture $M_{LCP}$ was prepared comprising the following liquid crystalline diacrylate monomers:

In addition to the diacrylate monomers, photoinitiator IRGACURE™ 369 from Ciba SC as well as BHT which served as an inhibitor were added to the mixture. Thus the composition of mixture $M_{LCP}$ was as follows:

| | |
|---|---|
| Mon1 | 77 wt. % |
| Mon2 | 14.5 wt. % |
| Mon3 | 4.7 wt. % |
| IRGACURE ™ 369 | 1.9 wt. % |
| BHT | 1.9 wt. % |

Finally, the solution S(LCP) resulted from dissolving 20 wt. % of mixture $M_{LCP}$ in anisole.

Like in example 5, solution S1 was spincoated on a glass plate, dried and subsequently exposed to the polarised UV-light, having an incidence angle of 70°. Then diacrylate solution S(LCP) was spin-coated at 800 rpm for 2 minutes on top of the irradiated LPP-layer. To cross-link the diacrylates the plate was exposed to isotropic UV-light under nitrogen atmosphere for 5 minutes.

Between crossed polarisers it was found that the LCP-layer was well aligned according the direction of the LPP-irradiating polarised UV-light. From the strong asymmetric viewing angle dependence of the LCP-retarder it was concluded that the optical axis of the LCP-layer was highly tilted.

To estimate the mean tilt angle of the optical axis, the effective optical anisotropy Δn, when looked perpendicularly through the layer was determined from measurements of the layer thickness d and the retardation Δnd as $\Delta n_{eff}$= 0.033. From the known Δn=0.13 of the LCP material the mean tilt angle of the optical axis was calculated as 58°.

What is claimed is:

1. A photoactive polymer, which comprises identical or different repeating monomer units M, wherein one or more of the monomer units M are substituted with at least one side chain as shown in formula I:

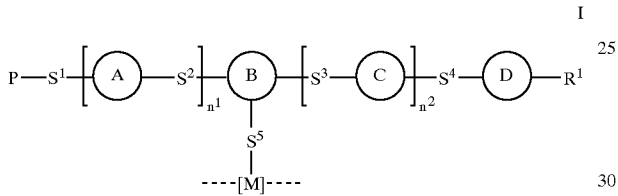

in which:
P is a photoactive group which can photoisomerise and/or photodimerise;
B represents an aromatic or alicyclic group which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, with the proviso that oxygen atoms are not directly attached to each other, and wherein $R^2$ represents a hydrogen atom or lower alkyl, or B alternatively represents a nitrogen atom or —$CR^2$—;
A, C, D each independently of the other represents an aromatic or alicyclic group which is unsubstituted or substituted by fluorine, chlorine, or cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, with the proviso that oxygen atoms are not directly attached to each other, and wherein $R^2$ represents a hydrogen atom or lower alkyl;
M represents a repeating monomer unit in a homo- or copolymer;
$S^1$, $S^2$, $S^3$, $S^4$, $S^5$ each independently represent a single covalent bond or a spacer unit, comprising a straight-chain or branched alkylene residue which is unsubstituted, mono-substituted by cyano or halogeno, or poly-substituted by halogeno, having 1 to 24 carbon atoms, wherein one or more $CH_2$ groups may independently be replaced by —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, with the proviso that oxygen atoms are not directly attached to each other, and wherein $R^2$ represents a hydrogen atom or lower alkyl;
$n^1$, $n^2$ are each independently 0, 1 or 2 with the proviso that $n^1+n^2 \leq 2$;
$R^1$ is a hydrogen atom, or a straight-chain or branched alkyl residue which is unsubstituted, mono-substituted by cyano or halogeno, or poly-substituted by halogeno, having 1 to 18 carbon atoms, wherein one or more $CH_2$ groups may independently be replaced by —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, with the proviso that oxygen atoms are not directly attached to each other, and wherein $R^2$ represents a hydrogen atom or lower alkyl.

2. A polymer as claimed in claim 1, in which group P is a group which undergoes a photocyclisation and has the formula II or III:

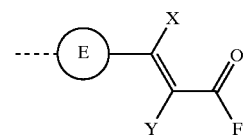

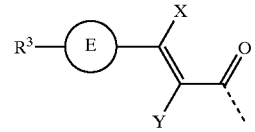

wherein the broken line indicates the point of linkage to $S^1$ and wherein:
E represents phenylene which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, with the proviso that oxygen atoms are not directly attached to each other, and wherein $R^2$ represents a hydrogen atom or lower alkyl, or E alternatively represents pyrimidine-2,5-diyl, pyridine-2,5-diyl, 2,5-thiophenylene, 2,5-furanylene, or 1,4- or 2,6-naphthylene;
F represents —$OR^4$, —$NR^5R$, or an oxygen atom linked to ring E in the ortho position to form a coumarin unit wherein $R^4$, $R^5$ and $R^6$ are a hydrogen atom or a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O—, —CO—, —CO—O—, —O—CO—, or —CH=CH—, with the proviso that oxygen atoms are not directly attached to each other, or $R^5$ and $R^6$ are linked together to form an alicyclic ring with 5 to 8 atoms;

X, Y each independently of the other represents hydrogen, fluorine, chlorine, cyano, alkyl optionally substituted by fluorine having from 1 to 12 carbon atoms in which optionally one or more non-adjacent $CH_2$ groups are replaced by —O—, —CO—O—, —O—CO— and/or —CH=CH—;

$R^3$ is a hydrogen atom, or a straight-chain or branched alkyl residue which is unsubstituted, mono-substituted by cyano or halogeno, or poly-substituted by halogeno, having 1 to 18 carbon atoms, wherein one or more $CH_2$ groups may independently be replaced by —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, with the proviso that oxygen atoms are not directly attached to each other, and wherein $R^2$ represents a hydrogen atom or lower alkyl.

3. A polymer as claimed in claim 2, in which group P has the formula IV or V:

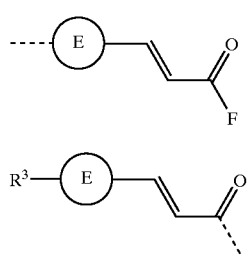

wherein the broken line indicates the point of linkage to $S^1$ and wherein $R^3$ has the meaning given under formula II and III in claim 2;

F represents —$OR^4$ or —$NR^5R^6$, wherein $R^4$ and $R^5$ are a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O— or —CH=CH—, with the proviso that oxygen atoms are not directly attached to each other, and wherein $R^6$ is a hydrogen atom or a cyclic, -straight-chain or branched alkyl residue which is unsubstituted, mono-substituted by halogeno, or poly-substituted by halogeno, having 1 to 18 carbon atoms and wherein one or more $CH_2$ groups may independently be replaced by —O— or —CH=CH—, with the proviso that oxygen atoms are not directly attached to each other, or $R^5$ and $R^6$ link together to form an alicyclic ring with 5 to 8 atoms; and E represents phenylene which is unsubstituted or substituted by a cyclic, straight-chain or branched alkyl residue which is unsubstituted, mono-substituted by halogeno, or poly-substituted by halogeno, having 1 to 12 carbon atoms and wherein one or more $CH_2$ groups may independently be replaced by —O—, —CO—, —CO—O—, —O—CO, —CH=CH—, or —C≡C—, with the proviso that oxygen atoms are not directly attached to each other, or E alternatively represents pyrimidine-2,5-diyl, pyridine-2,5-diyl, 2,5-thiophenylene, 2,5-furanylene, 1,4- or 2,6-naphthylene.

4. A polymer as claimed in claim 3, in which group P has the formula IV wherein:

E represents phenylene which is unsubstituted or substituted by a straight-chain or branched alkyl residue which is unsubstituted or mono- or polysubstituted by fluorine, having 1 to 6 carbon atoms and wherein one or more $CH_2$ groups may independently be replaced by —O—, —CO—, —CO—O—, —O—CO, or —CH=CH—, with the proviso that oxygen atoms are not directly attached to each other, or E alternatively represents pyrimidine-2,5-diyl, pyridine-2,5-diyl, 2,5-furanylene, 1,4- or 2,6-naphthylene;

F represents —$OR^4$ or —$NHR^5$, wherein $R^4$ and $R^5$ are a cyclic, straight-chain or branched alkyl residue which is unsubstituted or mono- or polysubstituted by fluorine, having 1 to 18 carbon atoms and wherein one or more $CH_2$ groups may independently be replaced by —O—, with the proviso that oxygen atoms are not directly attached to each other.

5. A polymer as claimed in claim 1, in which B represents an aromatic or alicyclic group and where $n^1+n^2=0$ or 1.

6. A polymer as claimed in claim 1, in which B represents a group —$CR^2$— and where $0<n^1+n^2\leq 2$.

7. A polymer as claimed in claim 1, in which the polymer is optically inactive.

8. A polymer as claimed in claim 1, in which group B is an aromatic group which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more $CH_2$ groups may independently be replaced by —O—, —CO—, —CO—O—, —O—CO—, or —CH=CH—, with the proviso that oxygen atoms are not directly attached to each other, or B alternatively represents —$CR^2$—, wherein $R^2$ represents hydrogen atom or lower alkyl.

9. A polymer as claimed in claim 8, in which group B is a 1,2,5-benzenetriyl or 1,3,5-benzenetriyl group which is unsubstituted or substituted by fluorine and where the spacer group $S^5$ is in position 1.

10. A polymer as claimed in claim 1, in which groups A, C and D are phenylene which is unsubstituted or substituted by fluorine, chlorine, or cyano, or by a cyclic, straight-chain or branched alkyl residue which is unsubstituted, mono-substituted by cyano or halogeno, or poly-substituted by halogeno, having 1 to 12 carbon atoms, wherein one or more $CH_2$ groups may independently be replaced by —O—, —CO—, —CO—O—, —O—CO—, —CH=CH—, —C≡C— or —O—CO—O— with the proviso that oxygen atoms are not directly attached to each other, or A, C and D alternatively represents cyclohexane-1,4-diyl, pyrimidine-2,5-diyl, pyridine-2,5-diyl, 1,4- or 2,6-naphthylene.

11. A polymer as claimed in claim 10, in which groups A, C and D are phenylene, which is unsubstituted or substituted by fluorine, straight-chain or branched alkyl residue which is unsubstituted or mono- or polysubstituted by fluorine, having 1 to 8 carbon atoms, wherein one or more $CH_2$ groups may independently be replaced by —O—, —CO—, —CO—O—, —O—CO— or —CH=CH— with the proviso that oxygen atoms are not directly attached to each other, or A, C and D alternatively represents cyclohexane-1,4-diyl, pyrimidine-2,5-diyl, pyridine-2,5-diyl or 2,6-naphthylene.

12. A polymer as claimed in claim 1, in which $S^1$, $S^2$, $S^3$, $S^4$ and $S^5$ each independently represent a single covalent bond or a straight-chain or branched alkylene grouping represented by —$(CH_2)_r$—, optionally mono- or poly-substituted by fluorine, chlorine or cyano, or a chain of the formula —$L^1$—$(CH_2)_r$—$L^2$— or —$L^1$—$(CH_2)_r$—$L^2$—$(CH_2)_s$—$L^3$—, wherein $L^1$, $L^2$ and $L^3$ each independently of the others represent a single bond or linking functional group, wherein $R^2$ represents hydrogen atom or lower alkyl and r and s are each an integer from 1 to 20, with the proviso that r+s$\leq$24 and with the proviso that in the case where the repeating monomer unit M is linked to $S^5$ via a nitrogen atom or a oxygen atom which is by definition part of M, $L^1$ signifies a single bond.

13. A polymer as claimed in claim 12, in which $S^1$, $S^2$, $S^3$, $S^4$ and $S^5$ are each independently a straight-chain or branched alkylene grouping, represented by —$(CH_2)_r$—, or are each independently —$(CH_2)_r$—O—, —$(CH_2)_r$—CO—, —$(CH_2)_r$—CO—O—, —$(CH_2)_r$—O—CO—, —$(CH_2)_r$—CO—$NR^2$—, —$(CH_2)_r$—$NR^2$—CO—, —$(CH_2)_r$—$NR^2$—, —O—$(CH_2)_r$—, —CO—O—$(CH_2)_r$—, —O—CO—$(CH_2)_r$—, —$NR^2$—CO—$(CH_2)_r$—, —CO—$NR^2$—$(CH_2)_r$—, —$NR^2$—$(CH_2)_r$—, —O—$(CH_2)_r$—CO—O—, —O—$(CH_2)_r$—O—CO—, —O—$(CH_2)_r$—CO—$NR^2$—, —O—$(CH_2)_r$—$NR^2$—, —O—$(CH_2)_r$—O—, —O—$(CH_2)_r$—$NR^2$—CO—, —$NR^2$—$(CH_2)_r$—CO—O—, —$NR^2$—$(CH_2)_r$—O—, —$NR^2$—$(CH_2)_r$—$NR^2$—, —$NR^2$—$(CH_2)_r$—O—CO—, —CO—$NR^2$—$(CH_2)_r$—O—, —CO—$NR^2$—$(CH_2)_r$—$NR^2$—, —CO—$NR^2$—$(CH_2)_r$—O—CO—, —O—CO—$(CH_2)_r$—CO—, —O—CO—$(CH_2)_r$—O—, —OCO—$(CH_2)_r$—O—CO—$(CH_2)_r$—$NR^2$—, —OCO—$(CH_2)_r$—CO—O—, —O—CO—$(CH_2)_r$—CO—$NR^2$—, —O—CO—$(CH_2)_r$—$NR^2$—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^2$—CO—$(CH_2)_s$—O—, —$(CH_2)_r$—$NR^2$—CO—O—$(CH_2)_s$—O—, —O—$(CH_2)_r$—O—$(CH_2)_s$—, —O—$(CH_2)_r$—CO—O—$(CH_2)_s$—, —O—$(CH_2)_r$—$NR^2$—CO—$(CH_2)_s$—, —O—$(CH_2)_r$—$NR^2$—CO—O—$(CH_2)_s$—, —O—$(CH_2)_r$—$NR^2$—CO—O—$(CH_2)_s$—, —O—$(CH_2)_r$—CO—O—$(CH_2)_s$—O—, —O—$(CH_2)_r$—$NR^2$—CO—$(CH_2)_s$—O—, —O—$(CH_2)_r$—$NR^2$—CO—O—$(CH_2)_s$—O—, —CO—O—$(CH_2)_r$—O—$(CH_2)_s$—, or —CO—O—$(CH_2)_r$—O—$(CH_2)_s$—O—, wherein r and s are each an integer from 1 to 20, with the proviso that r+s$\leq$21, and wherein $R^2$ represents hydrogen or lower alkyl.

14. A polymer as claimed in claim 13, in which $S^1$, $S^2$, $S^3$, $S^4$ and $S^5$ are each independently a straight-chain alkylene grouping represented by —$(CH_2)_r$—, or are each independently —$(CH_2)_r$—O—, —$(CH_2)_r$—CO—O—, —$(CH_2)_r$—O—CO—, —$(CH_2)_r$—CO—NH—, —$(CH_2)_r$—NH—CO—, —O—$(CH_2)_r$—, —CO—O—$(CH_2)_r$—, —CO—NH—$(CH_2)_r$—, —O—CO—$(CH_2)_r$—, —O—CO—$(CH_2)_r$—CO—O—, —O—$(CH_2)_r$—O—CO—, —O—$(CH_2)_r$—CO—NH—, —O—$(CH_2)_r$—NH—CO—, —CO—O—$(CH_2)_r$—O—, —CO—NH—$(CH_2)_r$—O—, —O—$(CH_2)_r$—O—, —$(CH_2)_r$—NH—CO—$(CH_2)_s$—, —$(CH_2)_r$—NH—CO—O—$(CH_2)_s$—, —$(CH_2)_r$—O—$(CH_2)_s$—O—, —$(CH_2)_r$—NH—CO—$(CH_2)_s$—O—, —$(CH_2)_r$—NH—CO—O—$(CH_2)_s$—O—, —O—$(CH_2)_r$—O—$(CH_2)_s$—O—, —O—$(CH_2)_r$—NH—CO—$(CH_2)_s$—O—, or —O—CO—$(CH_2)_r$—NH—CO—$(CH_2)_s$—O—, wherein r and s are each an integer from 2 to 12 and the sum of r+s$\leq$15.

15. A polymer as claimed in claim 1, in which $R^1$ is a hydrogen atom, or a straight-chain or branched alkyl residue which is unsubstituted or halogeno or polyhalogeno-substituted, having 1 to 12 carbon atoms, wherein one or more $CH_2$ groups may independently be replaced by —O—, —CO—, —CO—O—, —O—CO—, —CH=CH— or —C≡C—, with the proviso that oxygen atoms are not directly attached to each other.

16. A polymer as claimed in claim 15, in which $R^1$ is a straight-chain or branched alkyl residue, having 1 to 8 carbon atoms, wherein one or more $CH_2$ groups are each independently replaced by —O—, —CO—, —CO—O— or —O—CO— or —CH=CH—, with the proviso that oxygen atoms are not directly attached to each other.

17. A polymer as claimed in claim 1, in which the repeating monomer unit M is acrylate, methacrylate, a styrene derivative, an imide, an amic acid or an ester thereof or an amidimide.

18. A polymer as claimed in claim 1, in which the repeating monomer units M are one or more groups of the formulae III, V and VII and/or the analogous amic acid groups and amic acid ester groups of the formulae IV, VI and VIII:

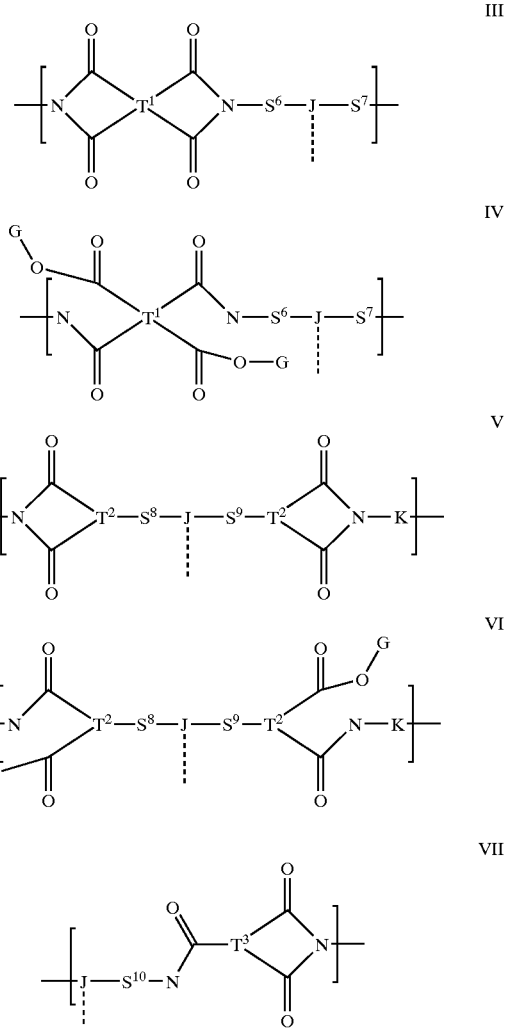

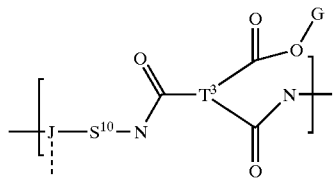

in which the broken line symbolises the linkage to $S^5$ and wherein:

$T^1$ represents the tetravalent organic radical of a tetracarboxylic acid dianhydride after formal removal of the two —CO—O—CO— groups, the four valencies of which are distributed between four different carbon atoms of the radical;

$T^2$, $T^3$ each independently of the other represents an aromatic or alicyclic trivalent group, the three valencies of which are distributed between three different carbon atoms of the group, the group being unsubstituted or substituted by fluorine, chlorine, cyano, by a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O—, —CO—, —CO—O—, —O—CO—, —CH=CH—, or —C≡C—, with the proviso that oxygen atoms are not directly attached to each other;

$S^6$, $S^7$, $S^8$, $S^9$, $S^{10}$ each independently represent a single covalent bond or a spacer unit, comprising a straight-chain or branched alkylene residue which is unsubstituted, mono-substituted by cyano or halogeno, or poly-substituted by halogeno, having 1 to 24 carbon atoms, wherein one or more $CH_2$ groups may independently be replaced by —O—, —CO—, —CO—O—, —O—CO—, —Si$(CH_3)_2$—O—Si$(CH_3)_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, with the proviso that oxygen atoms are not directly attached to each other, and wherein $R^2$ represents hydrogen atom or lower alkyl;

represents an aromatic or alicyclic divalent, trivalent or tetravalent group, the valencies of which are distributed between different atoms of the group, which is unsubstituted or substituted by fluorine, chlorine, cyano, by a cyclic, straight-chain or branched alkyl residue which is unsubstituted or mono cyano, or halogeno or polyhalogeno-substituted, having 1 to 18 carbon atoms and wherein one or more $CH_2$ groups may independently be replaced by —O—, —CO—, —CO—O—, —O—CO—, —CH=CH—, or —C≡C—, with the proviso that oxygen atoms are not directly attached to each other, or J alternatively represents a nitrogen atom or —$CR^2$— and wherein $R^2$ represents a hydrogen atom or lower alkyl;

K represents the radical of an aliphatic, alicyclic or aromatic diamine after formal removal of the two amino groups; and G represents hydrogen atom or a monovalent organic group, derived from an alcohol after formal removal of the hydroxy group.

19. A polymer as claimed in claim 18, in which the groups $T^2$ and $T^3$ are trivalent aromatic or carbocyclic groups, the three valencies of which are so distributed between three different carbon atoms that two of those valencies are located at adjacent carbon atoms.

20. A polymer as claimed in claim 19, in which the groups $T^2$ and $T^3$ are trivalent benzene derivatives, the three valencies of which are so distributed between three different carbon atoms that two of those valencies are in the ortho position relative to one another.

21. A polymer as claimed in claim 18, in which $S^6$ is a straight-chain or branched alkylene grouping, represented by —$(CH_2)_r$—, or is —$(CH_2)_r$—O—, —$(CH_2)_r$—CO—, —$(CH_2)_r$—CO—O—, —$(CH_2)_r$—O—CO—, —$(CH_2)_r$—CO—$NR^2$—, —$(CH_2)_r$—$NR^2$—CO—, —$(CH_2)_r$—$NR^2$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —$(CH_2)_r$—O—$(CH_2)_s$—O—, —$(CH_2)_r$—CO—O—$(CH_2)_s$—O—, —$(CH_2)_s$—O—, —$(CH_2)_r$—O—CO—$(CH_2)_s$—O—, —$(CH_2)_r$—$NR^2$—CO—$(CH_2)_s$—O—, —$(CH_2)_r$—$NR^2$—CO—O—$(CH_2)_s$—O—, —$(CH_2)_r$—O—$(CH_2)_s$—CO—O—, or —$(CH_2)_r$—O—$(CH_2)_s$—O—CO—, wherein r and s are each an integer from 1 to 20, with the proviso that r+s≤21, and wherein $R^2$ represents hydrogen or lower alkyl.

22. A polymer as claimed in claim 18, in which $S^7$ and $S^{10}$ are each independently a straight-chain or branched alkylene grouping, represented by —$(CH_2)_r$—, or are each independently —O—$(CH_2)_r$—, —CO—$(CH_2)_r$—, —CO—O—$(CH_2)_r$—, —O—CO—$(CH_2)_r$—, —$NR^2$—CO—$(CH_2)_r$—, —$NR^2$—$(CH_2)_r$—, —CO—$NR^2$—$(CH_2)_r$—, —$NR^2$—CO—$(CH_2)_r$—, —O—$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —O—$(CH_2)_r$—O—$(CH_2)_s$—, —O—$(CH_2)_r$—CO—O—$(CH_2)_s$—, —O—$(CH_2)_r$—O—CO—$(CH_2)_s$—, —O—$(CH_2)_r$—$NR^2$—CO—$(CH_2)_s$—, —O—$(CH_2)_r$—$NR^2$—CO—O—$(CH_2)_s$—, —O—CO—$(CH_2)_r$—O—$(CH_2)_s$—, or —CO—O—$(CH_2)_r$—O—$(CH_2)_s$—, wherein r and s are each an integer from 1 to 20, with the proviso that r+s≤21 and wherein $R^2$ represents hydrogen or lower alkyl.

23. A polymer as claimed in claim 18, in which $S^8$ and $S^9$ each independently are a straight-chain or branched alkylene grouping, represented by —$(CH_2)_r$—, or are each independently —$(CH_2)_r$—O—, —$(CH_2)_r$—CO—, —$(CH_2)_r$—CO—O—, —$(CH_2)_r$—O—CO—, —$(CH_2)_r$—CO—$NR^2$—, —$(CH_2)_r$—$NR^2$—CO—, —$(CH_2)_r$—$NR^2$—, —O—$(CH_2)_r$—, —CO—O—$(CH_2)_r$—, —O—CO—$(CH_2)_r$—, —$NR^2$—CO—$(CH_2)_r$—, —CO—$NR^2$—$(CH_2)_r$—, —$NR^2$—$(CH_2)_r$—, —O—$(CH_2)_r$—CO—O—, —O—$(CH_2)_r$—O—CO—, —O—$(CH_2)_r$—CO—$NR^2$—, —O—$(CH_2)_r$—$NR^2$—, —O—$(CH_2)_r$—O—, —O—$(CH_2)_r$—$NR^2$—CO—, —$NR^2$—$(CH_2)_r$—CO—O—, —$NR^2$—$(CH_2)_r$—O—, —$NR^2$—$(CH_2)_r$—$NR^2$—, —$NR^2$—$(CH_2)_r$—O—CO—, —CO—$NR^2$—$(CH_2)_r$—O—, —CO—$NR^2$—$(CH_2)_r$—$NR^2$—, —CO—$NR^2$—$(CH_2)_r$—O—CO—, —O—CO—$(CH_2)_r$—CO—, —O—CO—$(CH_2)_r$—O—, —O—CO—$(CH_2)_r$—$NR^2$—, —O—CO—$(CH_2)_r$—CO—O—, —O—CO—$(CH_2)_r$—$NR^2$—, —CO—$NR^2$—, —O—CO—$(CH_2)_r$—$NR^2$—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —$(CH_2)_r$—O—$(CH_2)_s$—O—, —$(CH_2)_r$—CO—O—$(CH_2)_s$—O—, —$(CH_2)_s$—O—, —$(CH_2)_r$—O—CO—$(CH_2)_s$—O—, —$(CH_2)_r$—$NR^2$—CO—$(CH_2)_s$—O—, —$(CH_2)_r$—$NR^2$—CO—O—$(CH_2)_s$—O—, —O—$(CH_2)_r$—O—$(CH_2)_s$—, —O—$(CH_2)_r$—CO—O—$(CH_2)_s$—, —O—$(CH_2)_r$—

$NR^2$—CO—$(CH_2)_s$—, —O—$(CH_2)_r$—$NR^2$—CO—O—$(CH_2)_s$—, —O—$(CH_2)_r$—CO—O—$(CH_2)_s$—O—, —O—$(CH_2)_r$—O—$(CH_2)_s$—O—, —O—$(CH_2)_r$—$NR^2$—CO—$(CH_2)_s$—O—, —O—$(CH_2)_r$—$NR^2$—CO—O—$(CH_2)_s$—O—, —CO—O—$(CH_2)_r$—O—$(CH_2)_s$—, or —CO—O—$(CH_2)_r$—O—$(CH_2)_s$—O—, wherein r and s are each an integer from 1 to 20, with the proviso that r+s≦21, and wherein $R^2$ represents hydrogen or lower alkyl.

24. A polymer according to claim 18, wherein at least 50% of the repeating monomer units M are linked to one or two of the side-chains.

25. A polymer according to claim 24, wherein at least 70% of the repeating monomer units M are linked to one or two of the side-chains.

26. A polymer according to claim 18, wherein the repeating monomer units M are each linked to only one side-chain.

27. A polymer as claimed in claim 18, which contains one or more groups of formulae IV, VI or VIII, in which G is hydrogen.

28. A polymer according to claim 1, wherein the polymer is a copolymer.

29. A composition comprising a polymer as claimed in claim 1 and a silane-containing compound and/or an epoxy-containing crosslinking agent.

30. A composition comprising a polymer as claimed in claim 1 and a photosensitiser, a photoradical generator and/or a cationic photoinitiator.

31. A composition comprising a polymer as claimed in claim 1 in mixture with one or more other polymers, oligomers, monomers, photoactive polymers, photoactive oligomers and/or photoactive monomers.

32. A product which comprises a polymer as claimed in claim 1 applied to a support, wherein the polymer applied to the support, after any imidisation step which may be necessary, has been crosslinked by irradiation with linearly polarized light.

33. An orientation layer for liquid crystals, which comprises a polymer as claimed in claim 1 that is crosslinked by irradiation with linearly polarized light.

34. A method of making an orientation layer as claimed in claim 33, which comprises preparing a solution of the polymer, applying the solution to a support, which support is optionally provided with an electrode, so that layers of 0.05 to 50 µm thickness are produced, then irradiating the regions to be oriented.

35. An optical or electro-optical device having at least one orientation layer as claimed in claim 33.

36. An unstructured or structured optical element or a multi-layer system, which comprises a polymer as claimed in claim 1.

* * * * *